(12) United States Patent
Gravel et al.

(10) Patent No.: US 9,426,096 B2
(45) Date of Patent: Aug. 23, 2016

(54) SINGLE-LANE, TWENTY-FIVE GIGABIT ETHERNET

(71) Applicant: Intel Corporation, Santa Clara, CA (US)

(72) Inventors: Alain Gravel, Thousand Oaks, CA (US); Robert G. Southworth, Chatsworth, CA (US); Jonathan A. Dama, Encino, CA (US); Ilango S. Ganga, Cupertino, CA (US); Matthew J. Webb, Woodland Hills, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 14/284,034

(22) Filed: May 21, 2014

(65) Prior Publication Data
US 2015/0341277 A1 Nov. 26, 2015

(51) Int. Cl.
| *H04L 12/931* | (2013.01) |
| *H04L 7/033* | (2006.01) |
| *H04L 12/825* | (2013.01) |
| *H04L 1/00* | (2006.01) |
| *H04L 12/413* | (2006.01) |

(52) U.S. Cl.
CPC .............. *H04L 49/352* (2013.01); *H04L 1/00* (2013.01); *H04L 1/0002* (2013.01); *H04L 7/033* (2013.01); *H04L 7/0331* (2013.01); *H04L 47/25* (2013.01); *H04L 12/413* (2013.01)

(58) Field of Classification Search
CPC ........... H04L 12/4604; H04L 41/0896; H04L 12/40136; H04L 49/352; H04L 1/0002
See application file for complete search history.

(56) References Cited

U.S. PATENT DOCUMENTS

| 2009/0187778 | A1* | 7/2009 | Diab ..................... G06F 1/3209 713/322 |
| 2012/0327769 | A1* | 12/2012 | Ghiasi .................... H04L 49/60 370/235 |
| 2013/0077623 | A1* | 3/2013 | Han ........................ H04L 47/25 370/389 |
| 2014/0003308 | A1* | 1/2014 | Varanese ............... H04J 3/1694 370/294 |
| 2015/0146744 | A1* | 5/2015 | Valliappan .......... H04L 41/0809 370/465 |

* cited by examiner

*Primary Examiner* — Omer S Mian
(74) *Attorney, Agent, or Firm* — Barnes & Thornburg LLP

(57) ABSTRACT

Technologies for high-speed data transmission including a network port logic having a communication lane coupled to a physical medium dependent/physical medium attachment (PMD/PMA) sublayer, a physical coding sublayer (PCS), and a media access control (MAC) sublayer. The communication lane receives serial binary data at a line speed such as 25 gigabits per second. The PMD/PMA converts the serial binary data into parallel data, and the PCS decodes that parallel data using a line code also used for a slower line speed such as 10 gigabits per second. The network port logic may include four independent communication lanes, with each communication lane coupled to a dedicated PMD/PMA, PCS, and MAC. The network port logic may also include a multi-lane PCS and multi-lane MAC to receive and transmit data striped over the four communication lanes. Other embodiments are described and claimed.

22 Claims, 5 Drawing Sheets

SINGLE-LANE, TWENTY-FIVE GIGABIT ETHERNET

BACKGROUND

Network infrastructure providers such as datacenter managers, Internet service providers, and Internet backbone providers typically require large amounts of network bandwidth. Current network devices such as managed switches may provide network data rates above 10 gigabits per second by aggregating data transferred over several lanes of a communication medium. For example, 100-gigabit Ethernet provided in a 100GBase-R4 mode may use four communication lanes to provide one hundred gigabits of network bandwidth. Typical communication mediums may include twisted pair, twinaxial copper wire, optical fiber, or electrical backplane.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
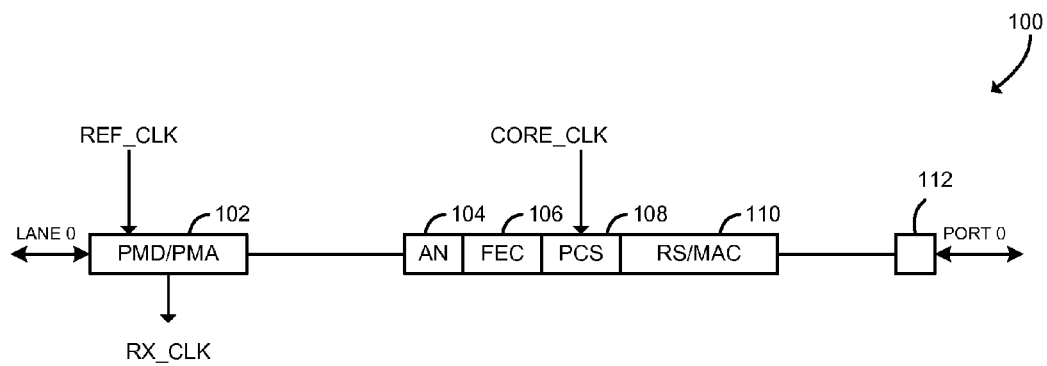
FIG. 1 is a simplified block diagram of at least one embodiment of Ethernet port logic for single-lane 25 gigabit Ethernet.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, an Ethernet port logic 100 is capable of communicating at 25 gigabits per second over a single communication lane. The communication lane may be embodied as any computer communication link. For example, the communication lane may be embodied as a twisted pair conductor, an optical fiber, or an electrical backplane connection. In some embodiments, the communication lane may be capable of full-duplex operation. For example, the communication lane may include two twisted pairs of electrical conductors, one pair for transmitting data and the other pair for receiving data. Thus, the Ethernet port logic 100 may provide improved performance relative to 10 gigabit Ethernet without requiring the expense of additional communication lanes. Additionally, in some embodiments, the Ethernet port logic 100 may allow some of the components used for 25-gigabit transmission, for example, the physical coding sublayer, to also be used for 10-gigabit transmission.

The illustrative Ethernet port logic 100 includes a physical medium dependent (PMD) sublayer/physical medium attachment (PMA) sublayer 102, an auto-negotiation module 104, a forward error correction (FEC) module 106, a physical coding sublayer (PCS) module 108, a reconciliation sublayer/media access control sublayer (MAC) module 110, and a port channel 112. Additionally, in some embodiments, one or more of the illustrative components may be incorporated in, or otherwise form a portion of, another component. For example, part or all of the PMD/PMA 102, the auto-negotiation module 104, and/or the FEC 106 may be incorporated in the PCS 108.

The PMD/PMA 102 is configured to transmit and receive serial binary data over the communication lane and to convert between the serial binary data and parallel data. For example, the PMD/PMA 102 may receive serial binary data and convert the serial data to 32-bit parallel binary data, and vice versa. The PMD/PMA 102 may be embodied as, for example, a serializer/deserializer (SERDES) that converts serial data to parallel data. The SERDES may convert the serial data using, for example, a shift register. The PMD/PMA 102 may be capable of transmitting and receiving serial data over the communication lane at several different line speeds. For example, the PMD/PMA 102 may be capable of transmitting and receiving serial data at 25.78125 gigabits per second, 10.3125 gigabits per second, 3.125 gigabits per second, or 1.25 gigabits per second. In some embodiments, the PMD/PMA 102 may execute a training protocol to tune transmission equalizers and otherwise verify that the communication lane is capable of communicating at the current line speed. The PMD/PMA 102 may output an RX_CLK signal that is derived from a clock signal recovered from the received serial data, for example using a phase-locked loop (PLL). The PMD/PMA 102 is also coupled to a reference clock signal REF_CLK that may be used to receive and/or transmit serial data. In some embodiments, the REF_CLK signal may be clocked at 156.25 MHz. The PMD/PMA 102 is further coupled to a data processing pipeline including the auto-negotiation module 104, the PCS 108, and the MAC 110. Although illustrated as communicating parallel data to the PCS 108, in other embodiments the PMD/PMA 102 may communicate with the PCS 108 using any appropriate technique. For example, the PMD/PMA 102 may communicate with the PCS 108 over a high-speed serial link, or in other embodiments the PMD/PMA 102 and the PCS 108 may be incorporated in a single integrated circuit chip.

The auto-negotiation module 104 is configured to auto-negotiate line transmission speed, mode of operation, and other communication parameters with a link partner when the communication lane is brought up. The auto-negotiation module 104 may be embodied as a state machine or other logic capable of implementing an auto-negotiation protocol. For example, the auto-negotiation module 104 may implement the auto-negotiation protocol specified by clause 73 of the IEEE 802.3 specification, clause 37 of the IEEE 802.3 specification, or the serial gigabit media independent interface (SGMII) auto-negotiation protocol. Although illustrated in FIG. 1 as coupled between the PMD/PMA 102 and the FEC 106, in other embodiments the auto-negotiation module 104 may be included at different positions in the Ethernet port logic 100. For example, in some embodiments the auto-negotiation module 104 may be coupled between the PMD/PMA 102 and the communication lane.

In some embodiments, the FEC 106 is configured to apply a forward error correction code to the data passed between the PMD/PMA 102 and the PCS 108. In other words, the FEC 106 may decode data passed from the PMD/PMA 102 to the PCS 108 and encode data passed from the PCS 108 to the PMD/PMA 102. The forward error correction code may improve the reliability of data transmission at higher line speeds. The FEC 106 may apply any appropriate forward error correction code. For example, the FEC 106 may apply the 10GBase-R forward error correction code or another forward error correction code.

The PCS 108 is configured to decode parallel data received from the PMD/PMA 102 into decoded parallel data that may be processed by the MAC 110, and to encode parallel data received from the MAC 110 into encoded parallel data that may be transmitted by the PMD/PMA 102. Data transmitted over the communication lane may be encoded, for example, to improve communication efficiency. For example, encoding the parallel data may add timing or synchronization symbols, align the data, add state transitions to the encoded data to improve clock recovery, adjust the DC balance of the data signal, or otherwise prepare the encoded data for serial transmission. The PCS 108 may be capable of encoding or decoding the parallel data using multiple line codes. For example, the PCS 108 may be capable of using a 64*b*/66*b* line code in which 64-bit blocks of data are encoded into 66-bit blocks of encoded data, and vice versa.

The MAC 110 is configured to convert the decoded parallel data generated by the PCS 108 into Ethernet frame data, and to convert received Ethernet frame data into parallel data that may be encoded by the PCS 108. The MAC 110 may perform Ethernet frame detection and validation, packet reception and transmission, cyclic redundancy check (CRC) validation, CRC computation, and other media access control sublayer operations. The MAC 110 is coupled to a port channel 112. The MAC 110 may send and receive Ethernet frame data to components attached to the Ethernet port logic 100 via the port channel 112. The port channel 112 may be embodied, for example, as a 16-bit communication channel operating at 1.56 GHz.

The auto-negotiation module 104, the FEC 106, the PCS 108, and the MAC 110 are all coupled to a core clock signal CORE_CLK that defines a core clock rate. For example, in some embodiments, the core clock rate may have a nominal rate of 800 MHz, with a minimum rate of 782 MHz. Each of the auto-negotiation module 104, the FEC 106, the PCS 108, and the MAC 110 all operate at the core clock rate regardless of the line speed of data transmitted or received over the communication lane. When operating at the core clock rate, the Ethernet port logic 100 may process serial data at its maximum line speed, for example, at 25.78125 gigabits per second. To process data at lower line speeds, for example at 10.3125 gigabits per second, the Ethernet port logic 100 may generate null operations for the FEC 106, PCS 108, and MAC 110. The null operations are essentially idle cycles or pipeline "bubbles" in which no useful work is performed by the FEC 106, PCS 108, and MAC 110. Processing null operations may reduce the effective clock rate of the FEC 106, PCS 108, and MAC 110, even though those components continue to operate at the core clock rate. The relative proportion of null operations generated depends on the line speed of the communication lane. Note that the auto-negotiation module 104 may perform link negotiation only at link startup and thus may not process null operations during data communications.

Figure 2:
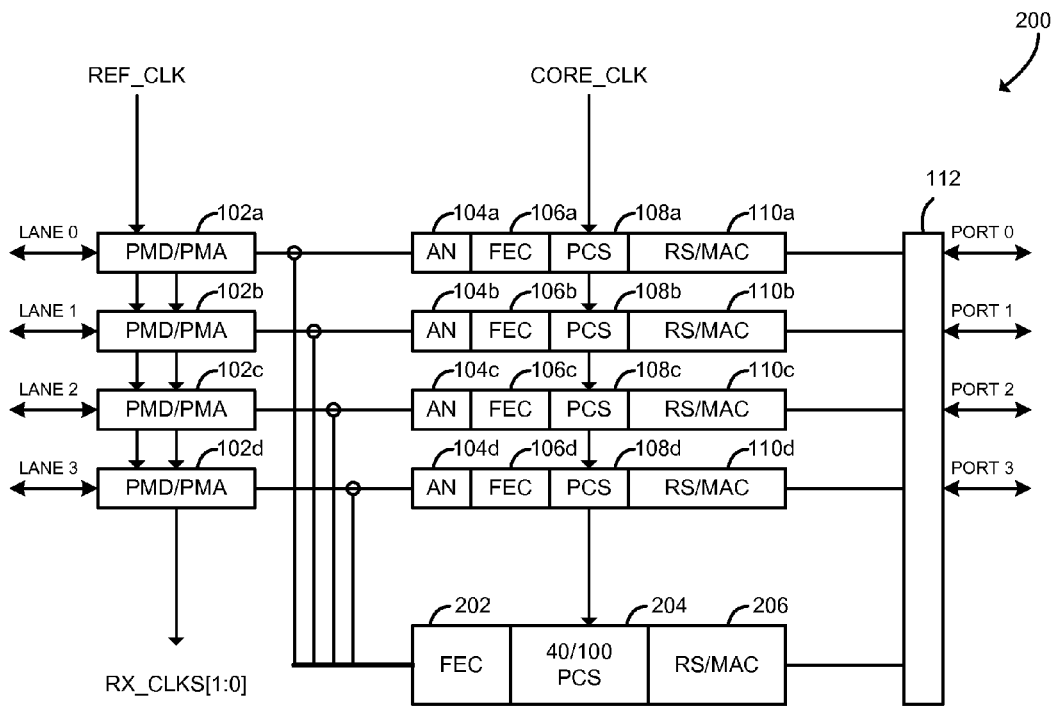
FIG. 2 is a simplified block diagram of at least one embodiment of Ethernet port logic for single-lane 25 gigabit Ethernet having four communication lanes.

Referring now to FIG. 2, in an illustrative embodiment, an Ethernet port logic 200 having four communication lanes is capable of communicating at 25 gigabits per second over each communication lane. As described above, each of the communication lanes may be embodied as any computer communication link, such as a twisted pair conductor, an optical fiber, or an electrical backplane connection. As shown in FIG. 2, the Ethernet port logic 200 essentially includes four Ethernet port logics 100 ganged together in parallel. In other words, the Ethernet port logic 200 includes four PMD/PMAs 102*a* through 102*d*, four auto-negotiation modules 104*a* through 104*d*, four FECs 106*a* through 106*d*, four PCSes 108*a* through 108*d*, four MACs 110*a* through 110*d*, and a four-port port channel 112. Thus, the description of the PMD/PMA 102, auto-negotiation module 104, FEC 106 PCS 108, and MAC 110 above in connection with the Ethernet port logic 100 is also applicable to the corresponding components of the Ethernet port logic 200 and is not repeated herein so as not to obscure the present disclosure. As shown, the PMD/PMA 102*a* is coupled to the auto-negotiation module 104*a*, the FEC 106*a*, the PCS 108*a* and the MAC 110*a*, and the MAC 110*a* is coupled to the port channel 112; the PMD/PMA 102*b* is coupled to the auto-negotiation module 104*b*, the FEC 106*b*, the PCS 108*b* and the MAC 110*b*, and the MAC 110*b* is coupled to the port channel 112; and so on.

The Ethernet port logic 200 outputs two signals labeled RX_CLKS[1:0], which are two clock signals derived from clock signals recovered from received data by the PMD/PMAs 102*a* through 102*d*. The received clock signals may be daisy-chained from one PMD/PMA 102 to the next. A configuration register of the Ethernet port logic 200 may define whether a particular PMD/PMA 102 should output a locally recovered clock signal or allow a previous recovered clock signal to pass through.

The Ethernet port logic 200 further includes a multi-lane FEC 202, a multi-lane PCS 204 and a MAC 206. Similar to the FECs 106*a* through 106*d*, in some embodiments, the multi-lane FEC 202 may apply a forward error correction code to data passed between the four PMD/PMAs 102*a* through 102*d* and the multi-lane PCS 204. The multi-lane PCS 204 is coupled to the parallel data output of all four of the PMD/PMAs 102*a* through 102*d*. The multi-lane PCS 204 is configured to decode parallel data received from the PMD/PMAs 102*a* through 102*d* into a single decoded parallel data stream that may be processed by the MAC 206. Similarly, the multi-lane PCS 204 is configured to encode a stream of parallel data received from the MAC 206 into four lanes of encoded parallel data that may be transmitted by the PMD/PMAs 102*a* through 102*d*. Data transmitted over the four communication lanes may be encoded, for example, to coordinate the distribution of data among the lanes, and to improve communication efficiency. For example, the multi-lane PCS 204 may encode four 64-bit blocks of data into four 66-bit encoded blocks, and may transmit each block sequentially across the four communication lanes. The multi-lane PCS 204 may also insert alignment markers on all lanes periodically to allow the link partner to realign blocks or otherwise synchronize communications. As part of the forward error correction code, the multi-lane FEC 202 may transcode between different line codes and insert or remove error correcting code (ECC) data. For example, the FEC 202 may transcode four 66-bit blocks of encoded data received from the multi-lane PCS into 257 bits of encoded data, and use the remaining bits for ECC and synchronization data. The multi-lane PCS 204 may also perform that conversion in reverse; that is, the multi-lane PCS 204 may receive four 66-bit encoded blocks sequentially over the four communication lanes, and then decode those four 66-bit encoded blocks into four 64-bit blocks of data. Similarly, the multi-lane FEC 202 may remove ECC and synchronization data and transcode 257 bits of encoded data into four 66-bit blocks of encoded data. As shown, in some embodiments the multi-lane PCS 204 may be embodied as a 40 gigabit/100 gigabit physical medium attachment sublayer/physical coding sublayer (PCS) module.

The MAC 206 is configured to convert the decoded parallel data generated by the multi-lane PCS 204 into Ethernet frame data, and to convert received Ethernet frame data into parallel data that may be encoded by the multi-lane PCS 204. Similar to the MACs 110, the MAC 206 may perform Ethernet frame detection and validation, packet reception and transmission, cyclic redundancy check (CRC) validation, CRC computation, and other media access control sublayer operations. The MAC 206 is coupled to the port channel 112 and may send and receive Ethernet frame data via the port channel 112. The port channel 112 may be embodied, for example, as four 16-bit communication channels, each operating at 1.56 GHz. When operating in multi-lane mode, the MAC 206 may communicate over all four ports of the port channel 112.

Although illustrated as including a separate multi-lane PCS 204 and MAC 206, in some embodiments those functions may be combined with or performed by other components of the Ethernet port logic 200. For example, in some embodiments, the multi-lane FEC 202, the multi-lane PCS 204, and the MAC 206 may be coupled to lane 0 and replace the FEC 106*a*, PCS 108*a*, and MAC 110*a*, respectively. Similarly, in some embodiments the Ethernet port logic 200 may use one of the auto-negotiation modules 104 (e.g., the auto-negotiation module 104*a* associated with lane 0) to negotiate multi-lane operation with the link partner. Additionally or alternatively, in some embodiments the Ethernet port logic 200 may include a multi-lane auto-negotiation module (not shown) that may be, for example, coupled to the multi-lane FEC 202, incorporated with the multi-lane PCS 204, or coupled between the PMD/PMAs 102 and the communication lanes.

Figure 3:
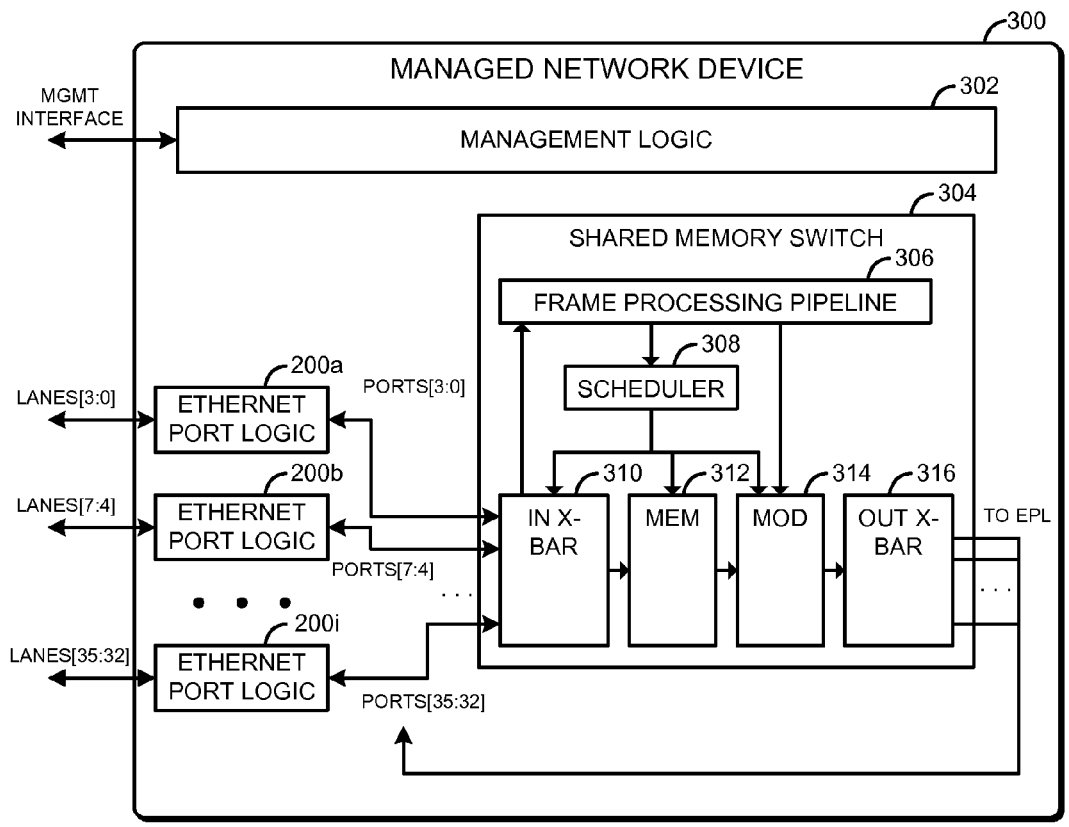
FIG. 3 is a simplified block diagram of at least one embodiment of a managed network device that may include the Ethernet port logic of FIGS. 1 and 2.

Referring now to FIG. 3, in an illustrative embodiment, a managed network device 300 may include the Ethernet port logic 200. The managed network device 300 may be embodied as any network device for routing or controlling network traffic, such as a managed switch. The illustrative managed network device 300 includes management logic 302, a shared memory switch 304, and nine Ethernet port logics 200*a* through 200*i*. Thus, the illustrative managed network device 300 includes 36 communication lanes and 36 associated ports. Of course, in other embodiments the managed network device 300 may include additional or fewer Ethernet port logics 200 to support a different number of communication lanes.

The management logic 302 may be embodied as any control circuit, microprocessor, or other logic block that may be used to configure and control the managed network device 300. For example, the management logic 302 may initialize the managed network device 300 and its components, control the configuration of the managed network device 300 and its components, provide a testing interface to the managed network device 300, or provide other management functions. The management logic 302 may be configured by changing the values of a number of registers in a global register space. Hosts may communicate with the management logic 302 using a management interface. The management interface may be embodied as any one or more computer connections, such as one or more PCI Express host interfaces, a test interface, or one or more low-speed interfaces such as an I2C interface, a JTAG interface, an SPI interface, an MDIO interface, an LED interface, or a GPIO interface. Additionally, hosts may communicate with the management logic 302 using an in-band management interface by transmitting specially formatted Ethernet frames on the communication lanes.

The shared memory switch 304 further includes a frame processing pipeline 306, a scheduler 308, an ingress crossbar 310, a frame memory 312, an egress modifier 314, and an egress crossbar 316. The ingress crossbar 310 is coupled to the ports of the Ethernet port logics 200*a* through 200*i* and thus receives Ethernet frames incoming to the shared memory switch 304. Ethernet data frames incoming into the shared memory switch 304 may be fragmented into segments, which may be stored in the frame memory 312 by the ingress crossbar 310. The fragmented segments may have a constant size, such as 192 bytes, or a variable size. The scheduler 308 manages the segment pool in the frame memory 312, sends commands to the ingress crossbar 310 and the egress crossbar 316 to move segments into the memory 312 or out of the memory 312, reports the arrival of segments to the frame processing pipeline 306, and schedules Ethernet frame transmission according to programmed priorities and shaping profiles. The scheduler 308 may also instruct the ingress crossbar 310 to send the first segment of the frame to the frame processing pipeline 306 for a switching decision. The frame processing pipeline 306 parses frame headers and may perform table lookups to determine the set of ports that each frame shall be sent to. A forwarding decision may be forwarded from the frame processing pipeline 306 to the scheduler 308, and new data generated for this new frame may be forwarded to the egress modifier 314. The frame processing pipeline 306 may also track segments consumed on ingress or freed on egress for accounting purposes. The egress modifier 314 may be instructed by the scheduler 308 of segment transmission and may apply the necessary transforms to the first segment of the frame using information stored for that frame that was supplied earlier by the frame processing pipeline 306. The transforms may include, for example, modifying a VLAN tag or routing the frame. The egress crossbar 316 is coupled to the ports of the Ethernet port logics 200a through 200i and thus may transmit Ethernet frames outgoing from the shared memory switch 304.

Figure 4:
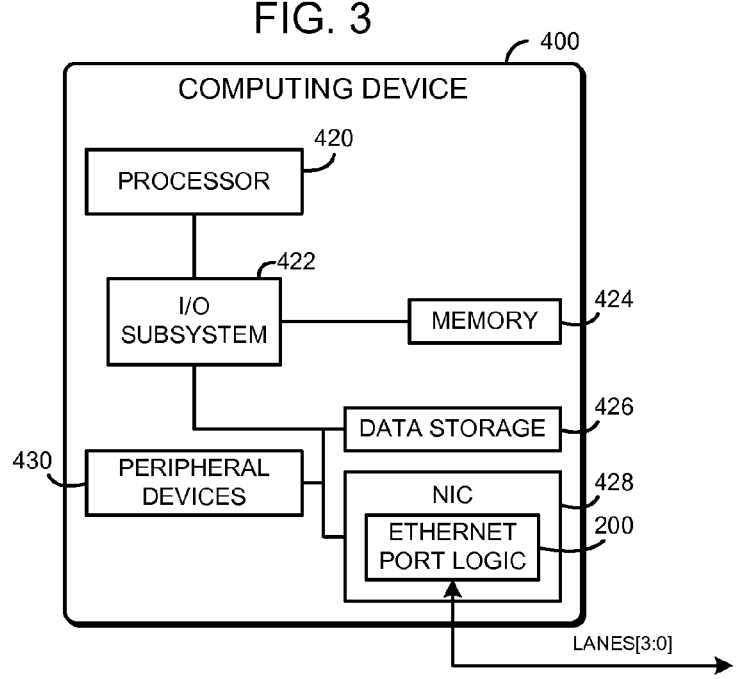
FIG. 4 is a simplified block diagram of at least one embodiment of a computing device that may include the Ethernet port logic of FIGS. 1 and 2.

Referring now to FIG. 4, in an illustrative embodiment, a computing device 400 may include the Ethernet port logic 200. The computing device 400 may be embodied as any type of computation or computer device capable of performing the functions described herein, including, without limitation, a computer, a smartphone, a tablet computer, a laptop computer, a notebook computer, a mobile computing device, a wearable computing device, a multiprocessor system, a server, a rack-mounted server, a blade server, a network appliance, a web appliance, a distributed computing system, a processor-based system, and/or a consumer electronic device. As shown in FIG. 1, the computing device 400 illustratively includes a processor 420, an input/output subsystem 422, a memory 424, a data storage device 426, and a network interface controller (NIC) 428. Of course, the computing device 400 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 424, or portions thereof, may be incorporated in the processor 420 in some embodiments.

The processor 420 may be embodied as any type of processor capable of performing the functions described herein. For example, the processor 420 may be embodied as a single or multi-core processor(s), digital signal processor, microcontroller, or other processor or processing/controlling circuit. Similarly, the memory 424 may be embodied as any type of volatile or non-volatile memory or data storage capable of performing the functions described herein. In operation, the memory 424 may store various data and software used during operation of the computing device 400 such as operating systems, applications, programs, libraries, and drivers. The memory 424 is communicatively coupled to the processor 420 via the I/O subsystem 422, which may be embodied as circuitry and/or components to facilitate input/output operations with the processor 420, the memory 424, and other components of the computing device 400. For example, the I/O subsystem 422 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 422 may form a portion of a system-on-a-chip (SoC) and be incorporated, along with the processor 420, the memory 424, and other components of the computing device 400, on a single integrated circuit chip. The data storage device 426 may be embodied as any type of device or devices configured for short-term or long-term storage of data such as, for example, memory devices and circuits, memory cards, hard disk drives, solid-state drives, or other data storage devices.

The NIC 428 may connect the computing device 400 to one or more computing devices, network devices, switches, remote hosts, or other devices. The NIC 428 may be embodied as one or more add-in-boards, daughtercards, controller chips, chipsets, or other devices that may be used by the computing device 400 for network communications with remote devices. For example, the NIC 428 may be embodied as an expansion card coupled to the I/O subsystem 422 over an expansion bus such as PCI Express. In the illustrative embodiment, the NIC 428 includes an Ethernet port logic 200 to connect to the remote devices. Although the illustrative computing device 400 includes one Ethernet port logic 200 including four communication lanes, in other embodiments the computing device 400 may include an Ethernet port logic 100 including a single communication lane. Of course, in other embodiments the computing device 400 may include additional or fewer Ethernet port logics 100, 200 to support a different number of communication lanes.

In some embodiments, the computing device 400 may also include one or more peripheral devices 430. The peripheral devices 430 may include any number of additional input/output devices, interface devices, and/or other peripheral devices. For example, in some embodiments, the peripheral devices 430 may include a display, touch screen, graphics circuitry, keyboard, mouse, speaker system, network interface, and/or other input/output devices, interface devices, and/or peripheral devices.

Figure 5:
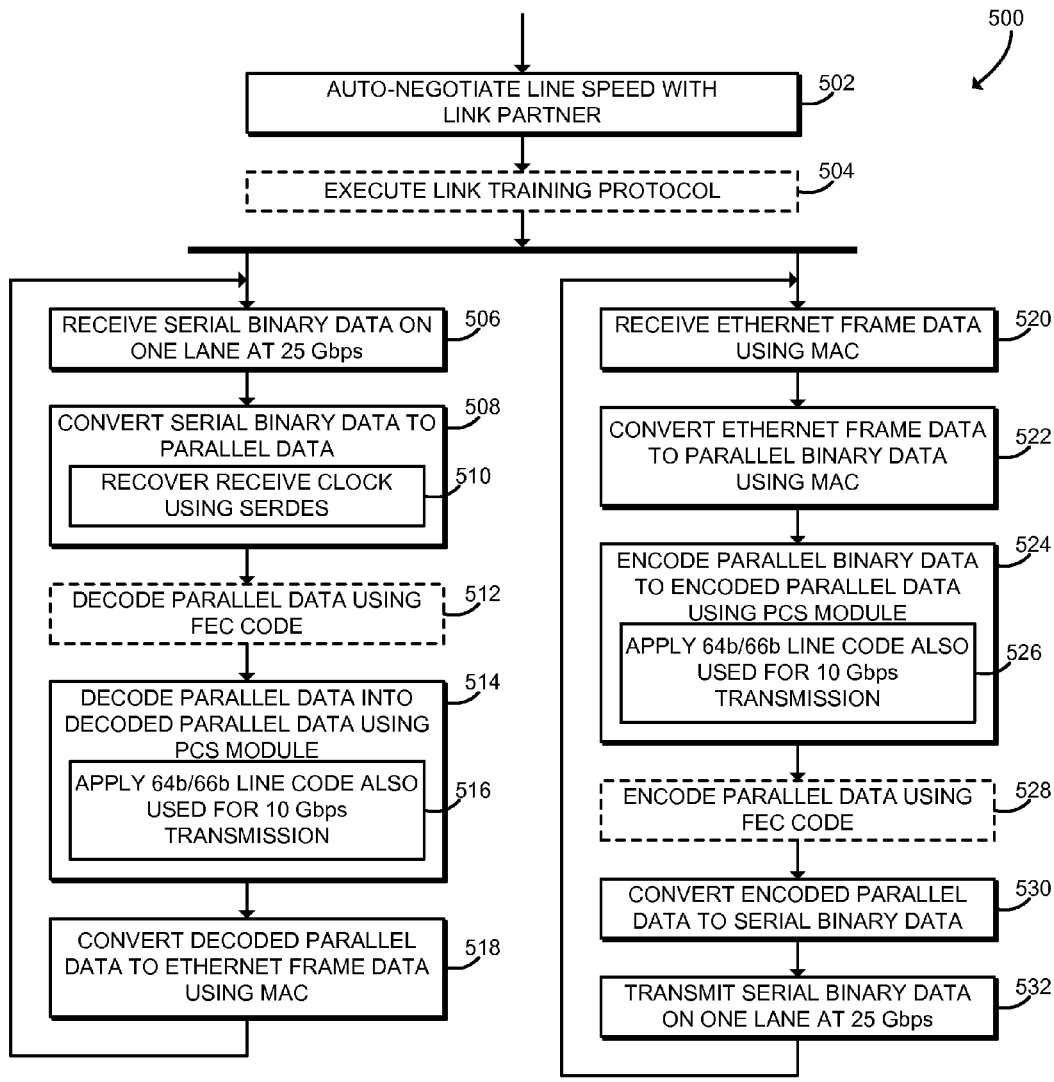
FIG. 5 is a simplified flow diagram of at least one embodiment of a method for single-lane 25 gigabit Ethernet that may be executed by the Ethernet port logic of FIGS. 1-4.

Referring now to FIG. 5, in use, the Ethernet port logic 100 may execute a method 500 for single-lane data transmission at 25 gigabits per second. Additionally or alternatively, the method 500 may be executed by a single lane of the multi-lane Ethernet port logic 200. The method 500 begins in block 502, in which the Ethernet port logic 100 auto-negotiates a line speed for the communication lane with a link partner. As described above, the auto-negotiation may be performed by the auto-negotiation module 104. The auto-negotiation module 104 may perform any auto-negotiation protocol, for example, clause 73 of the IEEE 802.3 specification, clause 37 of the IEEE 802.3 specification, or SGMII.

In block 504, in some embodiments the Ethernet port logic 100 may execute a link training protocol, also known as a startup protocol. The Ethernet port logic 100 may transmit and/or receive a predefined pattern over the communication lane. For example, the Ethernet port logic 100 may transmit a sequence of numbers generated by a predefined polynomial, such as the PRBS 11 training pattern, $x^{11}+x^9+1$, specified by the IEEE 802.3 specification. During execution of the link training protocol, the Ethernet port logic 100 may fine-tune transmission characteristics, for example by tuning the transmission equalizers or other parameters of the PMD/PMA 102. If the communication lane is not capable of stable transmission at the auto-negotiated line speed, in some embodiments the Ethernet port logic 100 may reduce or re-negotiate the line speed. After negotiating the line speed and performing any link training protocol, the method 500 advances in parallel to blocks 506 and 520.

In block 506, the Ethernet port logic 100 receives serial binary data on the single communication lane at 25.78125 gigabits per second. The Ethernet port logic 100 may receive the serial binary data in any format appropriate for the physical medium of the communication lane, such as a voltage differential, current differential, voltage value, current value, light pulse, or other signal received on the communication lane. In block 508, the Ethernet port logic 100 converts the serial binary data received over the communication lane into parallel data. The Ethernet port logic 100 may convert the serial binary data using the PMD/PMA 102. As described above, the PMD/PMA 102 may convert the serial binary data into a 32-bit wide parallel binary data signal. While receiving the serial binary data, in block 510, the Ethernet port logic 100 recovers the receive clock of the serial binary data using the PMD/PMA 102. The PMD/PMA 102 may use a phase-locked loop or other component to recover a clock signal RX_CLK from the signal received over the communication lane. Additionally or alternatively, in some embodiments the serial-to-parallel conversion may be performed by the PCS 108.

In some embodiments, in block 512 the Ethernet port logic 100 may decode the incoming parallel data using the FEC 106. As described above, the FEC 106 may decode the incoming parallel data using a forward error correction code. In some embodiments, the FEC 106 may reconstruct, repair, or otherwise correct transmission errors in the parallel data generated by the PMD/PMA 102. As described above, the FEC 106 may apply any appropriate forward error correction code, such as the 10GBase-R forward error correction code or another forward error correction code.

In block 514, the Ethernet port logic 100 decodes the parallel data from the PMD/PMA 102 into decoded parallel data using the PCS 108. As described above, the binary data transmitted over the communication lane may be encoded to improve transmission efficiency. The PCS 108 may apply any appropriate transformation, descrambling algorithm, or other function to the parallel data to produce the decoded parallel data. The PCS 108 may operate at the core clock rate to decode the parallel data at 25 gigabits per second. In some embodiments, the PCS 108 may execute null operations to reduce the effective clock rate of the PCS 108 and thereby decode the parallel data at a lower line transmission speed, such as 10 gigabits per second. In block 516, the Ethernet port logic 100 applies a 64b/66b line code that is also used for 10 gigabit per second serial transmissions. In other words, the PCS 108 applies the same decoding algorithm to 25-gigabit serial transmissions that is also used for 10-gigabit serial transmissions. For example, in some embodiments, the PCS 108 may apply the 64b/66b line code described in clause 49 of the IEEE 802.3 specification; that is, the 64b/66b line code used by 10GBase-R. Applying the 64b/66b line code may decode 66-bit blocks of encoded data to generate 64 bits of decoded data. The 66-bit encoded blocks may include a two-bit synchronization symbol and up to 64 bits of scrambled data as a payload. In some embodiments, the 66-bit encoded blocks may also include control commands and associated data. Illustrative 66-bit encoded blocks and 64-bit decoded blocks are shown in FIG. 6.

Figure 6:
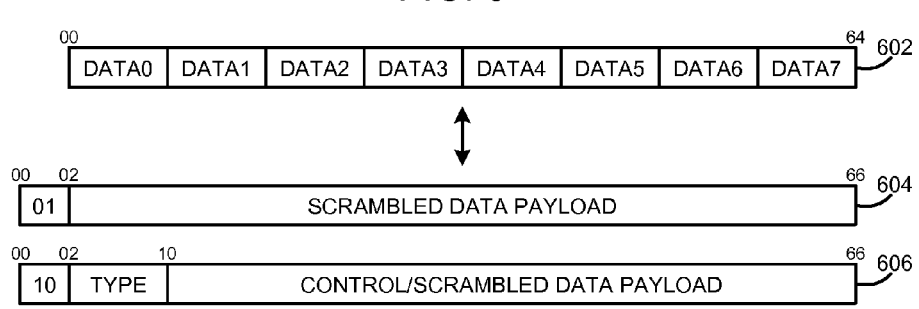
FIG. 6 is a schematic diagram illustrating a line code that may be used with the method of FIG. 5.

Referring now to FIG. 6, a schematic diagram 600 illustrates one embodiment of a 64b/66b line code. Block 602 represents 64 bits of decoded data, organized into eight octets. As described below, the decoded block 602 may represent decoded data output by the PCS 108 to the MAC 110, or may represent data output by the MAC 110 that is to be encoded by the PCS 108. The decoded block 602 may be converted to and/or from two types of encoded blocks 604, 606. The encoded block 604 represents 66 bits of encoded data. The block 604 starts with a two-bit synchronization symbol, in the illustrative embodiment '01.' The synchronization symbol is followed by 64 bits of scrambled data payload. The scrambled data payload may be generated by applying a predefined scrambling algorithm to the data block 602. For example, the scrambling algorithm may be embodied as a polynomial expression such as $x^{58}+x^{39}+1$. The encoded block 606 also represents 66 bits of encoded data. The block 606 starts with a two-bit synchronization symbol that is different from the synchronization symbol of the block 604. In the illustrative embodiment, the synchronization symbol is '10.' Both synchronization symbols include a state transition that may be used to synchronize clocks, align received encoded blocks, and perform other synchronization activities. The block 606 continues with a 64-bit scrambled payload including an eight-bit type value and 56 bits of control information and/or data. The scrambled payload may be generated using the same predefined scrambling algorithm described above.

Referring back to FIG. 5, after generating decoded parallel data with the PCS 108, in block 518 the Ethernet port logic 100 converts the decoded parallel data into Ethernet frame data using the MAC 110. As described above, the MAC 110 may perform Ethernet frame detection and validation, packet reception and transmission, cyclic redundancy check (CRC) validation, CRC computation, and other media access control sublayer operations. The MAC 110 produces the Ethernet frame data at a data rate determined by the line transmission speed of the communication lane. For example, in some embodiments, the line transmission speed may be 25.78125 gigabits per second. In those embodiments, after encoding overhead is removed by the PCS 108, the MAC 110 may generate Ethernet frame data at 25 gigabits per second. Similarly, for a line transmission speed of 10.3125 gigabits per second, the MAC 110 may generate Ethernet frame data at 10 gigabits per second. The Ethernet frame data is provided to the port channel 112, allowing the Ethernet frame data to be accessed by other components coupled to the Ethernet port logic 100. For example, the Ethernet frame data may be provided to the shared memory switch 304 of the managed network device 300, to the I/O subsystem 422 of the computing device 400, or to other components coupled to the Ethernet port logic 100. After generating the Ethernet frame data, the method 500 loops back to block 506 to continue receiving serial binary data over the communication lane.

Referring back to block 506, after the line transmission speed is negotiated and any link training protocol is executed, the method 500 advances in parallel to block 520. In block 520, the Ethernet port logic 100 receives Ethernet frame data using the MAC 110. The MAC 110 receives the Ethernet frame data via the port channel 112, which, as described above, may be coupled to the shared memory switch 304 of the managed network device 300, to the I/O subsystem 422 of the computing device 400, or to other components coupled to the Ethernet port logic 100. In block 522, the Ethernet port logic 100 converts the Ethernet frame data into parallel binary data using the MAC 110. The MAC 110 may, for example, transmit packet preambles and payloads, add padding to frames to reach minimum frame sizes, calculate and modify CRCs for frames, or perform other media access control sublayer operations.

In block 524, the Ethernet port logic 100 encodes the parallel binary data to encoded parallel data using the PCS 108. As described above, parallel data may be encoded to improve transmission efficiency over the serial communication lane. The PCS 108 may apply any appropriate transformation, scrambling algorithm, or other function to the parallel data to produce the encoded parallel data. In block 526, the Ethernet port logic 100 applies a 64b/66b line code that is also used for 10 gigabit per second serial transmissions. In other words, the PCS 108 applies the same encoding algorithm to 25-gigabit serial transmissions that is also used for 10-gigabit serial transmission. In some embodiments, the PCS 108 may apply the 64b/66b line code described in clause 49 of the IEEE 802.3 specification; that is, the 64b/66b line code used by 10GBase-R. The 64b/66b line code may encode each 64 bits of data into 66-bit blocks of encoded data. The 66-bit encoded blocks may include a two-bit synchronization symbol and up to 64 bits of scrambled data as a payload. As described above, illustrative 66-bit encoded blocks and 64-bit decoded blocks are shown in FIG. 6.

In some embodiments, in block 528 the Ethernet port logic 100 may encode the encoded parallel data using the FEC 106. As described above, the FEC 106 may encode the encoded parallel data generated by the PCS 108 using a forward error correction code. Encoding the already encoded parallel data may improve the reliability of data transmissions. As described above, the FEC 106 may apply any appropriate forward error correction code, such as the 10GBase-R forward error correction code or another forward error correction code.

In block 530, the Ethernet port logic 100 converts the encoded parallel data into serial binary data. The Ethernet port logic 100 may convert the encoded parallel data into serial binary data using the PMD/PMA 102. As described above, the PMD/PMA 102 may convert a 32-bit wide parallel binary data signal into serial binary data using, for example, a shift register. Additionally or alternatively, in some embodiments the parallel-to-serial conversion may be performed by the PCS 108. In block 532, the Ethernet port logic 100 transmits the serial binary data on the single communication lane at 25.78125 gigabits per second. The Ethernet port logic 100 may transmit the serial binary data in any format appropriate for the physical medium of the communication lane, such as a voltage differential, current differential, voltage value, current value, light pulse, or other signal received on the communication lane. After transmitting the serial data, the method 500 loops back to block 520 to continue transmitting serial binary data.

As shown in FIG. 5, the Ethernet port logic 100 may perform full-duplex communication over the communication lane. That is, the Ethernet port logic 100 may both receive and transmit data contemporaneously, in the illustrative embodiment by executing the blocks 506 through 514 in parallel with the blocks 520 through 526. Additionally or alternatively, in some embodiments the Ethernet port logic 100 may be capable of operating in half-duplex mode or in unidirectional communication modes.

Figure 7:
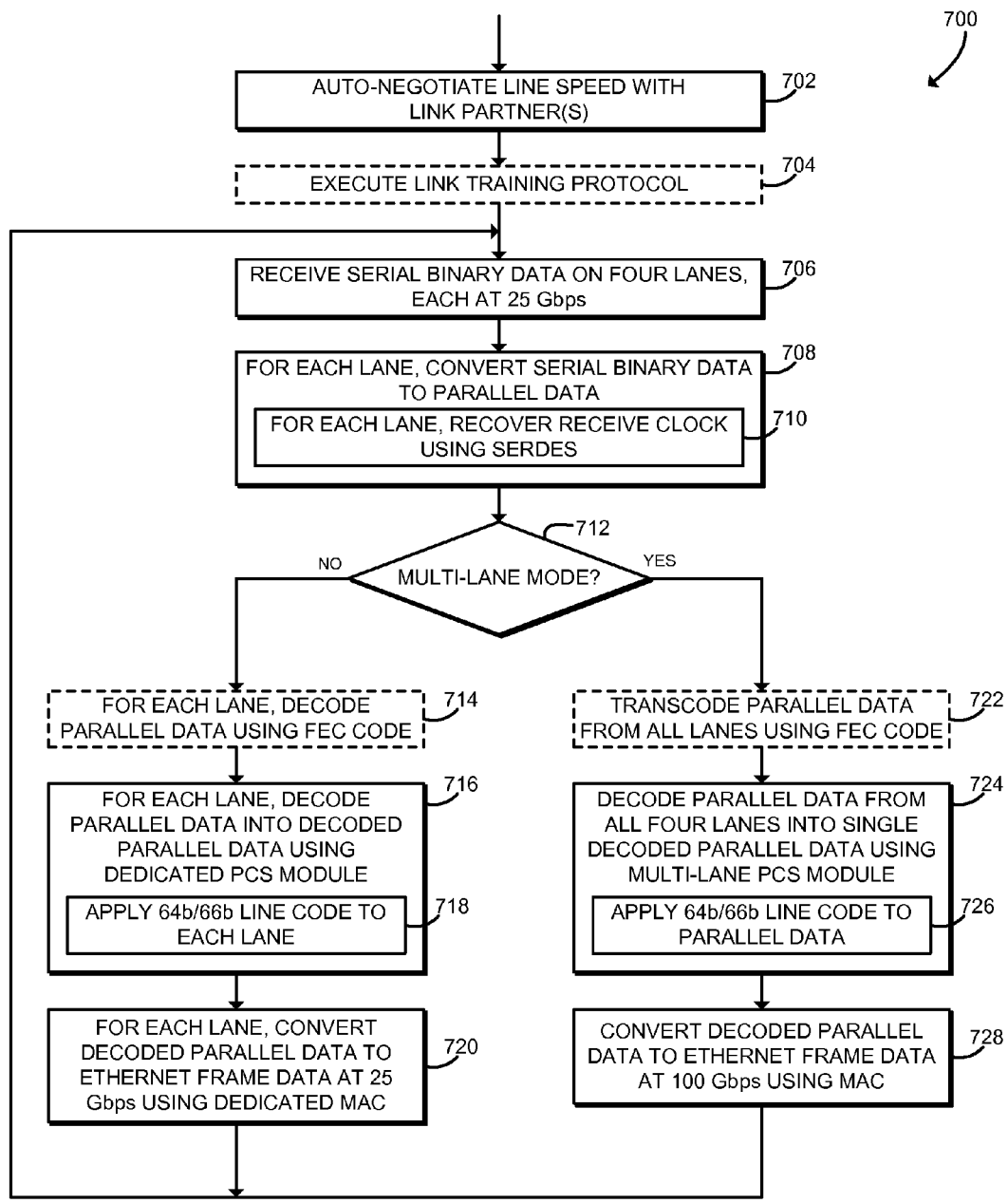
FIG. 7 is a simplified flow diagram of at least one embodiment of a method for multi-lane data reception that may be executed of the Ethernet port logic of FIGS. 1-4.

Referring now to FIG. 7, in use, the Ethernet port logic 200 may execute a method 700 for multi-lane data reception at 25 gigabits per second, per lane. The method 700 may be executed contemporaneously with the method 800 for multi-lane data transmission, described below in connection with FIG. 8. The method 700 begins in block 702, in which the Ethernet port logic 200 auto-negotiates a line speed for the communication lanes with one or more link partners. The Ethernet port logic 200 may also determine whether to communicate in multi-lane mode or to communicate over each lane independently. For example, the Ethernet port logic 200 may determine whether to communicate independently with four link partners over the communication lanes at 25.78125 gigabits per second, per lane, or whether to communicate with a single link partner in a multi-lane mode over the four communication lanes at 25.78125 gigabits per second, per lane (which produces about 100 gigabits per second of total bandwidth). As described above, the auto-negotiation may be performed by the auto-negotiation modules 104a through 104d, or in some embodiments by the multi-lane PCS 204.

In block 704, in some embodiments the Ethernet port logic 200 may execute a link training protocol, also known as a startup protocol. The Ethernet port logic 200 may transmit and/or receive a predefined pattern over each of the communication lanes. For example, the Ethernet port logic 200 may transmit on each lane a sequence of numbers generated by a predefined polynomial, such as the PRBS 11 training pattern. During execution of the link training protocol, the Ethernet port logic 200 may fine-tune transmission characteristics, for example by tuning transmission equalizers or other parameters of each of the PMD/PMAs 102a through 102d. The link training protocol is performed individually on a per-lane basis. Thus, if one of the communication lanes is not capable of stable transmission at the auto-negotiated line speed, in some embodiments the Ethernet port logic 200 may reduce or re-negotiate the line speed with the link partner at a lower line speed. After negotiating the line speed and mode of operation, the method 700 advances to block 706.

In block 706, the Ethernet port logic 200 receives serial binary data over the four communication lanes at 25.78125 gigabits per second, per lane. The Ethernet port logic 200 may receive the serial binary data in any format appropriate for the physical medium of the communication lanes, such as a voltage differential, current differential, voltage value, current value, light pulse, or other signal received on the communication lane. In block 708, the Ethernet port logic 200 converts the serial binary data received over the communication lane into parallel data. The Ethernet port logic 200 may convert the serial binary data using the PMD/PMAs 102a through 102d. As described above, each PMD/PMA 102 may convert the serial binary data received on the associated communication lane into a 32-bit wide parallel binary data signal. While receiving the serial binary data, in block 710, the Ethernet port logic 200 may recover one or more of the receive clocks of the serial binary data using the PMD/PMAs 102a through 102d. Each PMD/PMA 102 may use a phase-locked loop or other component to recover a clock signal RX_CLK from the signal received over the associated communication lane. Additionally or alternatively, in some embodiments the serial-to-parallel conversion may be performed by the PCSes 108a through 108d or by the multi-lane PCS 204.

In block 712, the Ethernet port logic 200 determines whether to operate in a multi-lane mode as negotiated with the link partner. If the Ethernet port logic 200 determines to operate in a multi-lane mode, the method 700 branches to block 722, described below. If the Ethernet port logic 200 determines not to operate in a multi-lane mode; that is, the Ethernet port logic 200 determines to operate each communication lane independently, the method 700 branches to block 714.

In some embodiments, in block 714 the Ethernet port logic 200 may, for each of the communication lanes, decode the incoming parallel data using the FECs 106*a* through 106*d*. For example, the FEC 106*a* may decode data generated by the PMD/PMA 102*a*, and so on. As described above, each FEC 106 may decode the incoming parallel data using a forward error correction code. In some embodiments, each FEC 106 may reconstruct, repair, or otherwise correct transmission errors in the parallel data generated by the corresponding PMD/PMA 102. As described above, each FEC 106 may apply any appropriate forward error correction code, such as the 10GBase-R forward error correction code or another forward error correction code.

In block 716, for each of the communication lanes, the Ethernet port logic 200 decodes the parallel data generated by the PMD/PMAs 102*a* through 102*d* into decoded parallel data using the PCSes 108*a* through 108*d*. For example, the PCS 108*a* decodes parallel data generated by the PMD/PMA 102*a*, the PCS 108*b* decodes parallel data generated by the PMD/PMA 102*b*, and so on. As described above, the binary data transmitted over each communication lane may be encoded to improve transmission efficiency. Each PCS 108 may apply any appropriate transformation, descrambling algorithm, or other function to the parallel data to produce the decoded parallel data. In block 718, the Ethernet port logic 200 applies a 64*b*/66*b* line code that is also used for 10 gigabit per second serial transmissions. In other words, each PCS 108 applies the same line code to 25-gigabit serial transmissions that is also used for 10-gigabit serial transmission. In some embodiments, each PCS 108 may apply the 64*b*/66*b* line code described in clause 49 of the IEEE 802.3 specification; that is, the 64*b*/66*b* line code used by 10GBase-R. The 64*b*/66*b* decoding system may decode 66-bit blocks of encoded data to generate 64 bits of decoded data. The 66-bit encoded blocks may include a two-bit synchronization symbol and up to 64 bits of scrambled data as a payload. In some embodiments, the 66-bit encoded blocks may also include control commands and associated data. Illustrative 66-bit encoded blocks and 64-bit decoded blocks are described above in connection with FIG. 6.

In block 720, for each communication lane, the Ethernet port logic 200 converts the decoded parallel data into Ethernet frame data using the MACs 110*a* through 110*d*. As described above, each MAC 110 may perform Ethernet frame detection and validation, packet reception and transmission, cyclic redundancy check (CRC) validation, CRC computation, and other media access control sublayer operations. Each MAC 110 produces the Ethernet frame data at a data rate determined by the line transmission speed of the associated communication lane. For example, in some embodiments, the line transmission speed may be 25.78125 gigabits per second. In those embodiments, after encoding overhead is removed by the associated PCS 108, the associated MAC 110 may generate Ethernet frame data at 25 gigabits per second. Similarly, for a line transmission speed of 10.3125 gigabits per second, each MAC 110 may generate Ethernet frame data at 10 gigabits per second. The Ethernet frame data is provided to the port channel 112, allowing the Ethernet frame data to be accessed by other components coupled to the Ethernet port logic 200. For example, the Ethernet frame data may be provided to the shared memory switch 304 of the managed network device 300, to the I/O subsystem 422 of the computing device 400, or to other components coupled to the Ethernet port logic 200. After generating the Ethernet frame data, the method 700 loops back to block 706 to continue receiving serial binary data over the four communication lanes.

Although illustrated in FIG. 7 as generating Ethernet frame data at 25 gigabits per second for each communication lane, in some embodiments each of the communication lanes and associated MACs 110*a* through 110*d* may be operated independently, at different speeds. For example, the MAC 110*a* may be operated at 10 gigabits per second, and the MAC 110*b* may be operated at 25 gigabits per second.

Referring back to block 712, if the Ethernet port logic 200 determines to operate in the multi-lane mode, the method 700 branches to block 722. In some embodiments, in block 722 the Ethernet port logic 200 may, for each of the communication lanes, decode the incoming parallel data using the multi-lane FEC 202. As described above, the multi-lane FEC 202 may decode the incoming parallel data using a forward error correction code. In some embodiments, the multi-lane FEC 202 may reconstruct, repair, or otherwise correct transmission errors in the parallel data generated by any of the PMD/PMAs 102*a* through 102*d*. As described above, the multi-lane FEC 202 may apply any appropriate forward error correction code, such as the 10GBase-R forward error correction code or another forward error correction code. For example, in some embodiments, the multi-lane FEC 202 may remove ECC and/or synchronization data from the incoming parallel data. Additionally, the multi-lane FEC 202 may transcode 257 bits of encoded incoming parallel data into four 66-bit blocks of encoded parallel data. In some embodiments, the multi-lane FEC 202 may apply a transcoding algorithm used by 100GBase-R4 as described in the IEEE 802.3 specification.

In block 724, the Ethernet port logic 200 decodes the parallel data generated by the PMD/PMAs 102*a* through 102*d* into a single decoded parallel data stream using the multi-lane PCS 204. As described above, the binary data transmitted over the communication lane may be encoded to improve transmission efficiency. The multi-lane PCS 204 may apply any appropriate transformation, descrambling algorithm, or other function to the parallel data to produce the decoded parallel data. In block 726, the Ethernet port logic 200 applies a 64*b*/66*b* line code to the parallel data. That line code may be different from the 64*b*/66*b* line code used by the PCSes 108*a* through 108*d*. For example, in some embodiments, the multi-lane PCS 204 may decode 66-bit blocks of encoded data received sequentially over the four communication lanes into 64-bit blocks of parallel data. The multi-lane PCS 204 may use alignment markers to align the blocks received across the communication lanes and then remove the alignment markers prior to decoding the incoming data. In some embodiments, the multilane may apply a decoding algorithm used by 100GBase-R as described in the IEEE 802.3 specification.

In block 728, the Ethernet port logic 200 converts the decoded parallel data from the multi-lane PCS 204 into Ethernet frame data using the MAC 206. As described above, the MAC 206 may perform Ethernet frame detection and validation, packet reception and transmission, cyclic redundancy check (CRC) validation, CRC computation, and other media access control sublayer operations. The MAC 206 produces the Ethernet frame data at a data rate that is equal to about four times the line transmission speed of each communication lane. For example, in some embodiments, the line transmission speed of each of the communication lanes may be 25.78125 gigabits per second. In those embodiments, after encoding overhead is removed by the multi-lane PCS 204, the MAC 206 may generate Ethernet frame data at about 100 gigabits per second. Similarly, for a line transmission speed of 10.3125 gigabits per second, the MAC 206 may generate Ethernet frame data at about 40 gigabits per second. The Ethernet frame data is provided to the port channel 112, allowing the Ethernet frame data to be accessed by other components coupled to the Ethernet port logic 200. For example, the Ethernet frame data may be provided to the shared memory switch 304 of the managed network device 300, to the I/O subsystem 422 of the computing device 400, or to other components coupled to the Ethernet port logic 200. After generating the Ethernet frame data, the method 700 loops back to block 706 to continue receiving serial binary data over the communication lanes.

Figure 8:
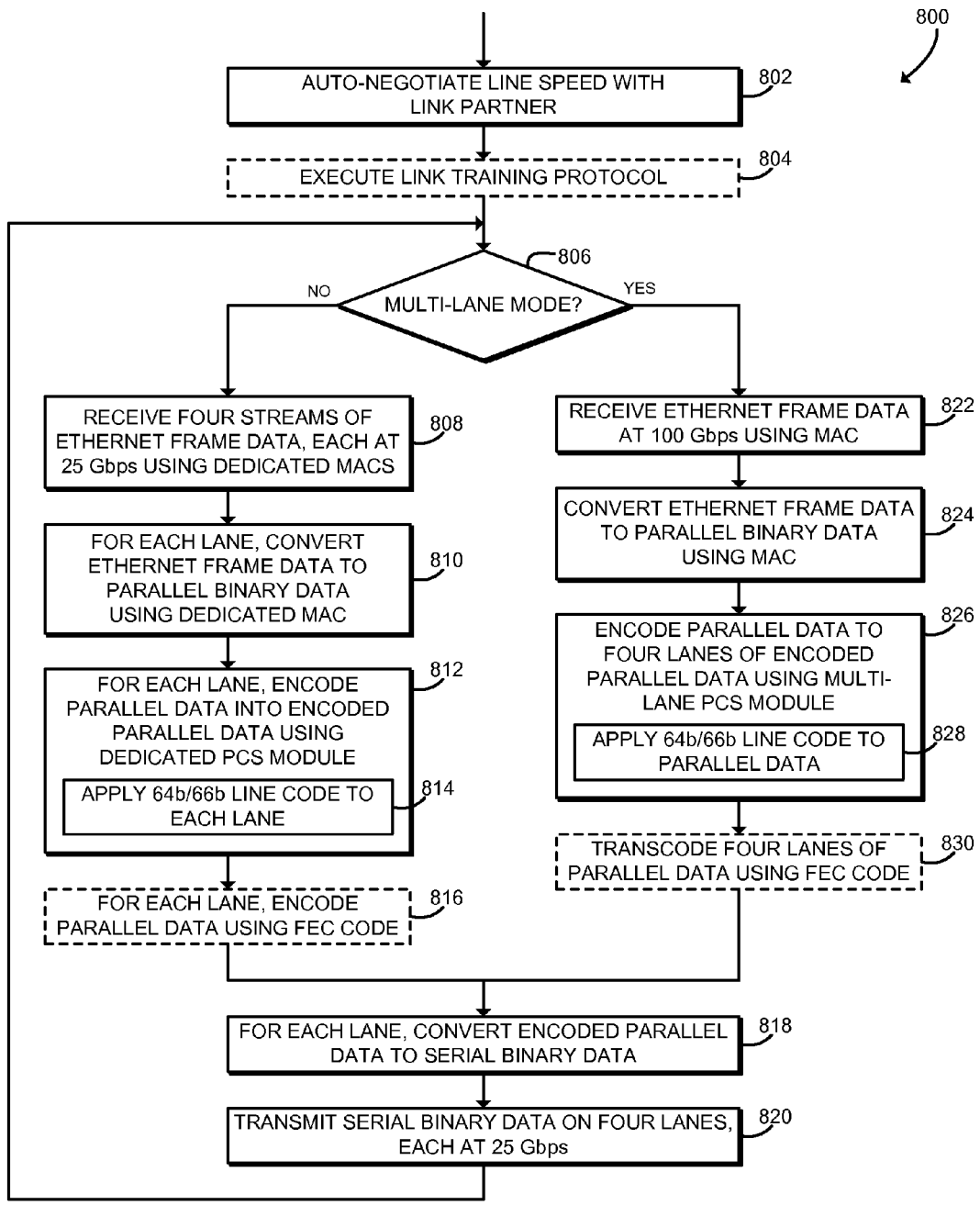
FIG. 8 is a simplified flow diagram of at least one embodiment of a method for multi-lane data transmission that may be executed of the Ethernet port logic of FIGS. 1-4.

Referring now to FIG. 8, in use, the Ethernet port logic 200 may execute a method 800 for multi-lane data transmission at 25 gigabits per second, per lane. As described above in connection with FIG. 7, the method 800 may be executed contemporaneously with the method 700 for multi-lane data reception. The method 800 begins in block 802, in which the Ethernet port logic 200 auto-negotiates a line speed for the communication lane with one or more link partners. The Ethernet port logic 200 may also determine whether to communicate in multi-lane mode or to communicate over each lane independently. For example, the Ethernet port logic 200 may determine whether to communicate independently with four link partners over the communication lanes at 25.78125 gigabits per second, per lane, or whether to communicate with a single link partner in a multi-lane mode over the communication lanes at 25.78125 gigabits per second, per lane (which produces about 100 gigabits per second of total bandwidth). As described above, the auto-negotiation may be performed by the auto-negotiation modules 104a through 104d, or in some embodiments by the multi-lane PCS 204.

In block 804, in some embodiments the Ethernet port logic 200 may execute a link training protocol, also known as a startup protocol. The Ethernet port logic 200 may transmit and/or receive a predefined pattern over each of the communication lanes. For example, the Ethernet port logic 200 may transmit on each lane a sequence of numbers generated by a predefined polynomial, such as the PRBS 11 training pattern. During execution of the link training protocol, the Ethernet port logic 200 may fine-tune transmission characteristics, for example by tuning transmission equalizers or other parameters of each of the PMD/PMAs 102a through 102d. The link training protocol is performed individually on a per-lane basis. Thus, if one of the communication lanes is not capable of stable transmission at the auto-negotiated line speed, in some embodiments the Ethernet port logic 200 may reduce or re-negotiate the line speed with the link partner at a slower line speed. After negotiating the line speed and mode of operation, the method 800 advances to block 806.

In block 806, the Ethernet port logic 200 determines whether to operate in a multi-lane mode as negotiated with the link partner. If the Ethernet port logic 200 determines to operate in a multi-lane mode, the method 800 branches to block 822, described below. If the Ethernet port logic 200 determines not to operate in a multi-lane mode; that is, if the Ethernet port logic 200 determines to operate each communication lane independently, the method 800 branches to block 808.

In block 808, the Ethernet port logic 200 receives four independent streams of Ethernet frame data using the MACs 110a through 110d. Each MAC 110 receives the Ethernet frame data via the port channel 112, which, as described above, may be coupled to the shared memory switch 304 of the managed network device 300, to the I/O subsystem 422 of the computing device 400, or to other components coupled to the Ethernet port logic 200. In block 810, for each communication lane, the Ethernet port logic 200 converts the Ethernet frame data into parallel binary data using the associated MAC 110. For example, the MAC 110a generates parallel binary data for the first communication lane, the MAC 110b generates parallel data for the second communication lane, and so on. Each MAC 110 may, for example, transmit packet preambles and payloads, add padding to frames to reach minimum frame sizes, calculate and modify CRCs for frames, or perform other media access control sublayer operations.

In block 812, for each communication lane, the Ethernet port logic 200 encodes the parallel binary data to encoded parallel data using the PCSes 108a through 108d. For example, the PCS 108a encodes parallel binary data produced by the MAC 110a, the PCS 108b encodes parallel binary data produced by the MAC 110b, and so on. As described above, parallel data may be encoded to improve transmission efficiency over the serial communication lane. Each PCS 108 may apply any appropriate transformation, scrambling algorithm, or other function to the parallel data to produce the encoded parallel data. In block 814, the Ethernet port logic 200 applies a 64b/66b line code that is also used for 10 gigabit per second serial transmissions. In other words, each PCS 108 applies the same encoding algorithm to 25-gigabit serial transmissions that is also used for 10-gigabit serial transmission. In some embodiments, each PCS 108 may apply the 64b/66b line code described in clause 49 of the IEEE 802.3 specification; that is, the 64b/66b line code used by 10GBase-R. The 64b/66b line code may encode each 64 bits of data into 66-bit blocks of encoded data. The 66-bit encoded blocks may include a two-bit synchronization symbol and up to 64 bits of scrambled data as a payload. As described above, illustrative 66-bit encoded blocks and 64-bit decoded blocks are shown in FIG. 6.

In some embodiments, in block 816 the Ethernet port logic 100 may encode the encoded parallel data using the FECs 106a through 106d. For example, the FEC 106a may encode the already encoded parallel data generated by the PCS 108a, and so on. As described above, each FEC 106 may encode the encoded parallel data generated by the corresponding PCS 108 using a forward error correction code. Encoding the already encoded parallel data may improve the reliability of data transmissions. As described above, each FEC 106 may apply any appropriate forward error correction code, such as the 10GBase-R forward error correction code or another forward error correction code.

After generating the encoded parallel data, the method 800 advances to block 818, in which the Ethernet port logic 200 converts the encoded parallel data into serial binary data. The Ethernet port logic 200 may convert the encoded parallel data using the PMD/PMAs 102a through 102d. For example, the PMD/PMA 102a converts the encoded data generated by the PCS 108a, the PMD/PMA 102b converts the encoded data generated by the PCS 108b, and so on. As described above, each PMD/PMA 102 may convert a 32-bit wide parallel binary data signal into serial binary data using, for example, a shift register. Additionally or alternatively, in some embodiments the parallel-to-serial conversion may be performed by the PCSes 108a through 108d or by the multi-lane PCS 204. In block 820, the Ethernet port logic 200 transmits the serial binary data on each of the communication lanes at 25.78125 gigabits per second. The Ethernet port logic 200 may transmit the serial binary data in any format appropriate for the physical medium of the communication lane, such as a voltage differential, current differential, voltage value, current value, light pulse, or other signal received on the communication lane. After transmitting the serial data, the method 800 loops back to block 806 to continue transmitting serial binary data.

Referring back to block 806, if the Ethernet port logic 200 determines to operate in the multi-lane mode, the method 800 branches to block 822. In block 822, the Ethernet port logic 200 receives one stream of Ethernet frame data using the MAC 206. The MAC 206 receives the Ethernet frame data via the port channel 112, which, as described above, may be coupled to the shared memory switch 304 of the managed network device 300, to the I/O subsystem 422 of the computing device 400, or to other components coupled to the Ethernet port logic 200. In block 824, the Ethernet port logic 200 converts the Ethernet frame data into parallel binary data using the MAC 206. The MAC 206 may, for example, transmit packet preambles and payloads, add padding to frames to reach minimum frame sizes, calculate and modify CRCs for frames, or perform other media access control sublayer operations.

In block 826, the Ethernet port logic 200 encodes the parallel binary data to encoded parallel data using the multi-lane PCS 204. As described above, the parallel data may be encoded to improve transmission efficiency over the serial communication lane. The multi-lane PCS 204 may apply any appropriate transformation, scrambling algorithm, or other function to the parallel data to produce the encoded parallel data. In block 828, the Ethernet port logic 200 applies a 64b/66b line code to the parallel data. That line code may be different from the 64b/66b line code used by the PCSes 108a through 108d. For example, in some embodiments, the multi-lane PCS 204 may encode 64-bit blocks of parallel data into 66-bit blocks of encoded data that may be transmitted sequentially over the four communication lanes. The multi-lane PCS 204 may insert alignment markers to allow the link partner to align the 66-bit encoded blocks. In some embodiments, the multilane may apply an encoding algorithm used by 100GBase-R as described in the IEEE 802.3 specification.

In some embodiments, in block 830 the Ethernet port logic 100 may transcode the four lanes of encoded parallel data using the multi-lane FEC 202. As described above, multi-lane FEC 202 may encode the encoded parallel data generated by the multi-lane PCS 204 using a forward error correction code. Encoding the already encoded parallel data may improve the reliability of data transmissions. As described above, the multi-lane FEC 202 may apply any appropriate forward error correction code, such as the 10GBase-R forward error correction code or another forward error correction code. For example, in some embodiments, the multi-lane FEC 202 may transcode four 66-bit blocks of encoded parallel data into 257 bits of encoded outgoing parallel data. Transcoding the encoded data allow the multi-lane FEC 202 to insert ECC and/or synchronization into the outgoing incoming parallel data. In some embodiments, the multi-lane FEC 202 may apply a transcoding algorithm used by 100GBase-R4, as described in the IEEE 802.3 specification. After generating the parallel data in multi-lane mode, the method 800 advances to block 818 to convert the encoded parallel data to serial data for each communication lane, as described above.

EXAMPLES

Illustrative examples of the technologies disclosed herein are provided below. An embodiment of the technologies may include any one or more, and any combination of, the examples described below.

Example 1 includes a network port logic for high-speed data transmission, the network port logic comprising a first physical medium dependent sublayer/physical medium attachment sublayer (PMD/PMA) logic coupled to a first communication lane to convert first serial binary data received via the first communication lane at a first line transmission speed to first parallel data; a first physical coding sublayer (PCS) logic coupled to the first PMD/PMA logic to decode the first parallel data to decoded parallel data using a line code also used by the PCS logic for serial binary data transmitted at a second line transmission speed, wherein the second line transmission speed is less than the first line transmission speed; and a first media access control (MAC) logic coupled to the first PCS logic to convert the decoded parallel data to first Ethernet frame data at a data rate determined by the first line transmission speed.

Example 2 includes the subject matter of Example 1, and wherein to decode the first parallel data comprises to decode an encoded block, wherein the encoded block comprises an unscrambled sync symbol and a scrambled data section indicative of the decoded parallel data.

Example 3 includes the subject matter of any of Examples 1 and 2, and wherein the encoded block comprises 66 bits, the sync symbol comprises two bits, and the scrambled data section comprises 64 bits indicative of 64 bits of decoded parallel data.

Example 4 includes the subject matter of any of Examples 1-3, and wherein the encoded block further includes a scrambled control symbol.

Example 5 includes the subject matter of any of Examples 1-4, and wherein the PMD/PMA logic comprises a serializer/deserializer (SERDES).

Example 6 includes the subject matter of any of Examples 1-5, and wherein the first PMD/PMA logic is further to convert second serial binary data received via the first communication lane at the second line transmission speed to second parallel data; the first PCS logic is further to decode the second parallel data to second decoded parallel data using the line code; and the first MAC logic is further to convert the second decoded parallel data to second Ethernet frame data at a second data rate determined by the second line transmission speed.

Example 7 includes the subject matter of any of Examples 1-6, and further including a core clock signal to define a core clock rate, wherein the first PCS logic and the first MAC logic are to operate at the core clock rate; and an auto-negotiation module to negotiate with a link partner whether to receive via the first transmission lane at the first line transmission speed or at the second line transmission speed; and generate a plurality of null operations to be executed by the first PCS logic and the first MAC logic in response to receipt of the second serial binary data at the second line transmission speed, wherein the null operations are to cause the first PCS logic and the first MAC logic to operate at an effective clock rate lower than the core clock rate.

Example 8 includes the subject matter of any of Examples 1-7, and wherein the first line transmission speed comprises about 25 gigabits per second, the second line transmission speed comprises about 10 gigabits per second, and the data rate determined by the first line transmission speed comprises 25 gigabits per second.

Example 9 includes the subject matter of any of Examples 1-8, and wherein the first line transmission speed comprises 25.78125 gigabits per second and the second line transmission speed comprises 10.3125 gigabits per second.

Example 10 includes the subject matter of any of Examples 1-9, and further including an auto-negotiation module to negotiate with a link partner whether to receive via the first transmission lane at the first line transmission speed or at the second line transmission speed; wherein the first PMD/PMA logic is further to (i) execute a link training protocol in response to a negotiation with the link partner to receive at the first line transmission speed and (ii) execute the same link training protocol in response to a negotiation with the link partner to receive at the second line transmission speed.

Example 11 includes the subject matter of any of Examples 1-10, and wherein to execute the link training protocol comprises to generate a signal pattern as a function of a predefined polynomial expression.

Example 12 includes the subject matter of any of Examples 1-11, and wherein the first line transmission speed comprises about 25 gigabits per second, the second line transmission speed comprises about 10 gigabits per second, and the signal pattern comprises a PRBS 11 training pattern.

Example 13 includes the subject matter of any of Examples 1-12, and wherein the first MAC logic is further to (i) receive second Ethernet frame data at the data rate determined by the first line transmission speed and (ii) convert the second Ethernet frame data to second parallel data; the first PCS logic is further to encode the second parallel data to encoded parallel data using the line code; and the first PMD/PMA logic is further to (i) convert the encoded parallel data to second serial binary data and (ii) transmit the second parallel binary data via the first communication lane at the first line transmission speed.

Example 14 includes the subject matter of any of Examples 1-13, and wherein the network port logic comprises four PMD/PMA logics, wherein each of the PMD/PMA logics is coupled to a corresponding communication lane and is to convert the serial binary data received via the corresponding communication lane at the first line transmission speed to parallel data, and wherein the four PMD/PMA logics comprise the first PMD/PMA logic; four PCS logics, wherein each of the PCS logics is coupled to a corresponding PMD/PMA logic and is to decode the parallel data to decoded parallel data using the line code also used by the PCS logic for serial binary data transmitted at the second line transmission speed, wherein the four PCS logics comprise the first PCS logic; and four MAC logics, wherein each of the MAC logics is coupled to a corresponding PCS logic and is to convert the decoded parallel data to Ethernet frame data at the data rate determined by the first line transmission speed, wherein the four MAC logics comprise the first MAC logic.

Example 15 includes the subject matter of any of Examples 1-14, and further including a multi-lane PCS logic coupled to the four PMD/PMA logics to decode the parallel data to decoded parallel data using a multi-lane line code different from the line code also used by the PCS logics for serial binary data transmitted at the second line transmission speed; and a fifth MAC logic coupled to the multi-lane PCS logic to convert the decoded parallel data to Ethernet frame data at a data rate equal to about four times the first line transmission speed.

Example 16 includes the subject matter of any of Examples 1-15, and wherein the first line transmission speed comprises about 25 gigabits per second, the second line transmission speed comprises about 10 gigabits per second, the data rate determined by the first line transmission speed comprises 25 gigabits per second, and the data equal to about four times the first line transmission speed comprises 100 gigabits per second.

Example 17 includes the subject matter of any of Examples 1-16, and further including an port channel coupled to the four MAC logics and the fifth MAC logic; and a network switch fabric coupled to the port channel.

Example 18 includes the subject matter of any of Examples 1-17, and wherein the first communication lane comprises a pair of electrical conductors.

Example 19 includes the subject matter of any of Examples 1-18, and wherein the first communication lane comprises an electrical backplane connection.

Example 20 includes the subject matter of any of Examples 1-19, and wherein the first communication lane comprises an optical communication lane.

Example 21 includes a method for high-speed data transmission, the method comprising receiving, by a network port logic, first serial binary data via a first communication lane at a first line transmission speed; converting, by a physical medium dependent sublayer/physical medium attachment sublayer (PMD/PMA) logic of the network port logic, the first serial binary data to first parallel data; decoding, by a physical coding sublayer (PCS) logic of the network port logic, the first parallel data to decoded parallel data using a line code also used by the PCS logic for serial binary data transmitted at a second line transmission speed, wherein the second line transmission speed is less than the first line transmission speed; and converting, by a media access control (MAC) logic of the network port logic, the decoded parallel data to first Ethernet frame data at a data rate determined by the first line transmission speed.

Example 22 includes the subject matter of Example 21, and wherein decoding the first parallel data comprises decoding an encoded block, wherein the encoded block comprises an unscrambled sync symbol and a scrambled data section indicative of the decoded parallel data.

Example 23 includes the subject matter of any of Examples 21 and 22, and wherein the encoded block comprises 66 bits, the sync symbol comprises two bits, and the scrambled data section comprises 64 bits indicative of 64 bits of decoded parallel data.

Example 24 includes the subject matter of any of Examples 21-23, and wherein the encoded block further includes a scrambled control symbol.

Example 25 includes the subject matter of any of Examples 21-24, and wherein the PMD/PMA logic comprises a serializer/deserializer (SERDES)

Example 26 includes the subject matter of any of Examples 21-25, and further including receiving, by the network port logic, second serial binary data via the first communication lane at the second line transmission speed; converting, by the PMD/PMA logic of the network port logic, the second serial binary data to second parallel data; decoding, by the PCS logic of the network port logic, the second parallel data to second decoded parallel data using the line code; and converting, by the MAC logic of the network port logic, the second decoded parallel data to second Ethernet frame data at a second data rate determined by the second line transmission speed.

Example 27 includes the subject matter of any of Examples 21-26, and further including negotiating, by the network port logic with a link partner, whether to receive via the first transmission lane at the first line transmission speed or at the second line transmission speed; operating, by the network port logic, the PCS logic and the MAC logic at a core clock rate; and operating, by the network port logic, the PCS logic and the MAC logic at an effective clock rate lower than the core clock rate in response to negotiating to receive the second serial binary data at the second line transmission speed by generating a plurality of null operations to be executed by the PCS logic and the MAC logic.

Example 28 includes the subject matter of any of Examples 21-27, and wherein the first line transmission speed comprises about 25 gigabits per second, the second line transmission speed comprises about 10 gigabits per second, and the data rate determined by the first line transmission speed comprises 25 gigabits per second.

Example 29 includes the subject matter of any of Examples 21-28, and wherein the first line transmission speed comprises 25.78125 gigabits per second and the second line transmission speed comprises 10.3125 gigabits per second.

Example 30 includes the subject matter of any of Examples 21-29, and further including negotiating, by the network port logic with a link partner, whether to receive via the first transmission lane at the first line transmission speed or at the second line transmission speed; executing, by the network port logic, a link training protocol in response to negotiating with the link partner to receive at the first line transmission speed; and executing, by the network port logic, the same link training protocol in response to negotiating with the link partner to receive at the second line transmission speed.

Example 31 includes the subject matter of any of Examples 21-30, and wherein executing the link training protocol comprises generating a signal pattern as a function of a predefined polynomial expression.

Example 32 includes the subject matter of any of Examples 21-31, and wherein the first line transmission speed comprises about 25 gigabits per second, the second line transmission speed comprises about 10 gigabits per second, and the signal pattern comprises a PRBS 11 training pattern.

Example 33 includes the subject matter of any of Examples 21-32, and further including receiving, by the MAC logic of the network port logic, second Ethernet frame data at the data rate determined by the first line transmission speed; converting, by the MAC logic of the network port logic, the second Ethernet frame data to second parallel data; encoding, by the PCS logic of the network port logic, the second parallel data to encoded parallel data using the line code; converting, by the PMD/PMA logic of the network port logic, the encoded parallel data to second serial binary data; and transmitting, by the network port logic, the second parallel binary data via the first communication lane at the first line transmission speed.

Example 34 includes the subject matter of any of Examples 21-33, and further including receiving, by the network port logic, second serial binary data via a second communication lane at the first line transmission speed; converting, by a second PMD/PMA logic of the network port logic, the second serial binary data to second parallel data; decoding, by a second physical coding sublayer (PCS) logic of the network port logic, the second parallel data to second decoded parallel data using the line code; converting, by a second media access control (MAC) logic of the network port logic, the second decoded parallel data to second Ethernet frame data at the data rate determined by the first line transmission speed; receiving, by the network port logic, third serial binary data via a third communication lane at the first line transmission speed; converting, by a third PMD/PMA logic of the network port logic, the third serial binary data to third parallel data; decoding, by a third physical coding sublayer (PCS) logic of the network port logic, the third parallel data to third decoded parallel data using the line code; converting, by a third media access control (MAC) logic of the network port logic, the third decoded parallel data to third Ethernet frame data at the data rate determined by the first line transmission speed receiving, by the network port logic, fourth serial binary data via a fourth communication lane at the first line transmission speed; converting, by a fourth PMD/PMA logic of the network port logic, the fourth serial binary data to fourth parallel data; decoding, by a fourth physical coding sublayer (PCS) logic of the network port logic, the fourth parallel data to fourth decoded parallel data using the line code; and converting, by a fourth media access control (MAC) logic of the network port logic, the fourth decoded parallel data to fourth Ethernet frame data at the data rate determined by the first line transmission speed.

Example 35 includes the subject matter of any of Examples 21-34, and further including receiving, by the network port logic, fifth serial binary data via the first communication lane at the first line transmission speed, sixth serial binary data via the second communication lane at the first line transmission speed, seventh serial binary data via the third communication lane at the first line transmission speed, and eighth serial binary data via the fourth communication lane at the first line transmission speed; converting, by the first PMD/PMA logic of the network port logic, the fifth serial binary data to fifth parallel data; converting, by the second PMD/PMA logic of the network port logic, the sixth serial binary data to sixth parallel data; converting, by the third PMD/PMA logic of the network port logic, the seventh serial binary data to seventh parallel data; converting, by the fourth PMD/PMA logic of the network port logic, the eighth serial binary data to eighth parallel data; decoding, by a multi-lane physical coding sublayer (PCS) logic of the network port logic, the fifth parallel data, sixth parallel data, seventh parallel data, and eighth parallel data to fifth decoded parallel data using an multi-lane line code different from the line code also used by the first PCS logic, the second PCS logic, the third PCS logic, and the fourth PCS logic for serial binary data transmitted at the second line transmission speed; and converting, by a fifth media access control (MAC) logic of the network port logic, the fifth decoded parallel data to fifth Ethernet frame data at a data rate equal to about four times the first line transmission speed.

Example 36 includes the subject matter of any of Examples 21-35, and wherein the first line transmission speed comprises about 25 gigabits per second, the second line transmission speed comprises about 10 gigabits per second, the data rate determined by the first line transmission speed comprises 25 gigabits per second, and the data rate equal to about four times the first line transmission speed comprises 100 gigabits per second.

Example 37 includes a computing device comprising a processor; and a memory having stored therein a plurality of instructions that when executed by the processor cause the computing device to perform the method of any of Examples 21-36.

Example 38 includes one or more machine readable storage media comprising a plurality of instructions stored thereon that in response to being executed result in a computing device performing the method of any of Examples 21-36.

Example 39 includes a computing device comprising means for performing the method of any of Examples 21-36.

Example 40 includes a network port logic for high-speed data transmission, the network port logic comprising means for receiving first serial binary data via a first communication lane at a first line transmission speed; means for converting, by a physical medium dependent sublayer/physical medium attachment sublayer (PMD/PMA) logic of the network port logic, the first serial binary data to first parallel data; means for decoding, by a physical coding sublayer (PCS) logic of the network port logic, the first parallel data to decoded parallel data using a line code also used by the PCS logic for serial binary data transmitted at a second line transmission speed, wherein the second line transmission speed is less than the first line transmission speed; and means for converting, by a media access control (MAC) logic of the network port logic, the decoded parallel data to first Ethernet frame data at a data rate determined by the first line transmission speed.

Example 41 includes the subject matter of Example 40, and wherein the means for decoding the first parallel data comprises means for decoding an encoded block, wherein the encoded block comprises an unscrambled sync symbol and a scrambled data section indicative of the decoded parallel data.

Example 42 includes the subject matter of any of Examples 40 and 41, and wherein the encoded block comprises 66 bits, the sync symbol comprises two bits, and the scrambled data section comprises 64 bits indicative of 64 bits of decoded parallel data.

Example 43 includes the subject matter of any of Examples 40-42, and wherein the encoded block further includes a scrambled control symbol.

Example 44 includes the subject matter of any of Examples 40-43, and wherein the PMD/PMA logic comprises a serializer/deserializer (SERDES)

Example 45 includes the subject matter of any of Examples 40-44, and further including means for receiving second serial binary data via the first communication lane at the second line transmission speed; means for converting, by the PMD/PMA logic of the network port logic, the second serial binary data to second parallel data; means for decoding, by the PCS logic of the network port logic, the second parallel data to second decoded parallel data using the line code; and means for converting, by the MAC logic of the network port logic, the second decoded parallel data to second Ethernet frame data at a second data rate determined by the second line transmission speed.

Example 46 includes the subject matter of any of Examples 40-45, and further including means for negotiating, with a link partner, whether to receive via the first transmission lane at the first line transmission speed or at the second line transmission speed; means for operating the PCS logic and the MAC logic at a core clock rate; and means for operating the PCS logic and the MAC logic at an effective clock rate lower than the core clock rate in response to negotiating to receive the second serial binary data at the second line transmission speed by generating a plurality of null operations to be executed by the PCS logic and the MAC logic.

Example 47 includes the subject matter of any of Examples 40-46, and wherein the first line transmission speed comprises about 25 gigabits per second, the second line transmission speed comprises about 10 gigabits per second, and the data rate determined by the first line transmission speed comprises 25 gigabits per second.

Example 48 includes the subject matter of any of Examples 40-47, and wherein the first line transmission speed comprises 25.78125 gigabits per second and the second line transmission speed comprises 10.3125 gigabits per second.

Example 49 includes the subject matter of any of Examples 40-48, and further including means for negotiating, with a link partner, whether to receive via the first transmission lane at the first line transmission speed or at the second line transmission speed; means for executing a link training protocol in response to negotiating with the link partner to receive at the first line transmission speed; and means for executing the same link training protocol in response to negotiating with the link partner to receive at the second line transmission speed.

Example 50 includes the subject matter of any of Examples 40-49, and wherein the means for executing the link training protocol comprises means for generating a signal pattern as a function of a predefined polynomial expression.

Example 51 includes the subject matter of any of Examples 40-50, and wherein the first line transmission speed comprises about 25 gigabits per second, the second line transmission speed comprises about 10 gigabits per second, and the signal pattern comprises a PRBS 11 training pattern.

Example 52 includes the subject matter of any of Examples 40-51, and further including means for receiving, by the MAC logic of the network port logic, second Ethernet frame data at the data rate determined by the first line transmission speed; means for converting, by the MAC logic of the network port logic, the second Ethernet frame data to second parallel data; means for encoding, by the PCS logic of the network port logic, the second parallel data to encoded parallel data using the line code; means for converting, by the PMD/PMA logic of the network port logic, the encoded parallel data to second serial binary data; and means for transmitting the second parallel binary data via the first communication lane at the first line transmission speed.

Example 53 includes the subject matter of any of Examples 40-52, and further including means for receiving second serial binary data via a second communication lane at the first line transmission speed; means for converting, by a second PMD/PMA logic of the network port logic, the second serial binary data to second parallel data; means for decoding, by a second physical coding sublayer (PCS) logic of the network port logic, the second parallel data to second decoded parallel data using the line code; means for converting, by a second media access control (MAC) logic of the network port logic, the second decoded parallel data to second Ethernet frame data at the data rate determined by the first line transmission speed; means for receiving third serial binary data via a third communication lane at the first line transmission speed; means for converting, by a third PMD/PMA logic of the network port logic, the third serial binary data to third parallel data; means for decoding, by a third physical coding sublayer (PCS) logic of the network port logic, the third parallel data to third decoded parallel data using the line code; means for converting, by a third media access control (MAC) logic of the network port logic, the third decoded parallel data to third Ethernet frame data at the data rate determined by the first line transmission speed; means for receiving fourth serial binary data via a fourth communication lane at the first line transmission speed; means for converting, by a fourth PMD/PMA logic of the network port logic, the fourth serial binary data to fourth parallel data; means for decoding, by a fourth physical coding sublayer (PCS) logic of the network port logic, the fourth parallel data to fourth decoded parallel data using the line code; and means for converting, by a fourth media access control (MAC) logic of the network port logic, the fourth decoded parallel data to fourth Ethernet frame data at the data rate determined by the first line transmission speed.

Example 54 includes the subject matter of any of Examples 40-53, and further including means for receiving fifth serial binary data via the first communication lane at the first line transmission speed, sixth serial binary data via the second communication lane at the first line transmission speed, seventh serial binary data via the third communication lane at the first line transmission speed, and eighth serial binary data via the fourth communication lane at the first line transmission speed; means for converting, by the first PMD/PMA logic of the network port logic, the fifth serial binary data to fifth parallel data; means for converting, by the second PMD/PMA logic of the network port logic, the sixth serial binary data to sixth parallel data; means for converting, by the third PMD/PMA logic of the network port logic, the seventh serial binary data to seventh parallel data; means for converting, by the fourth PMD/PMA logic of the network port logic, the eighth serial binary data to eighth parallel data; means for decoding, by a multi-lane physical coding sublayer (PCS) logic of the network port logic, the fifth parallel data, sixth parallel data, seventh parallel data, and eighth parallel data to fifth decoded parallel data using an multi-lane line code different from the line code also used by the first PCS logic, the second PCS logic, the third PCS logic, and the fourth PCS logic for serial binary data transmitted at the second line transmission speed; and means for converting, by a fifth media access control (MAC) logic of the network port logic, the fifth decoded parallel data to fifth Ethernet frame data at a data rate equal to about four times the first line transmission speed.

Example 55 includes the subject matter of any of Examples 40-54, and wherein the first line transmission speed comprises about 25 gigabits per second, the second line transmission speed comprises about 10 gigabits per second, the data rate determined by the first line transmission speed comprises 25 gigabits per second, and the data rate equal to about four times the first line transmission speed comprises 100 gigabits per second.

The invention claimed is:

1. A network port logic for high-speed data transmission, the network port logic comprising:
a first physical medium dependent sublayer/physical medium attachment sublayer (PMD/PMA) logic coupled to a first communication lane to convert first serial binary data received via the first communication lane at a first line transmission speed to first parallel data, and a second PMD/PMA logic to convert second serial binary data to second parallel data received at a second line transmission speed, wherein the second transmission line speed is less than the first line transmission speed;
a first physical coding sublayer (PCS) logic coupled to the first PMD/PMA logic to decode, when the network port logic is not in a multi-lane mode, the first parallel data to first decoded parallel data using a first line code also used by a second PCS logic, coupled to the second PMD/PMA logic, to decode the second parallel data to second decoded parallel data when the network port logic is not in the multi-lane mode;
a multi-lane PCS logic coupled to the first PMD/PMA logic and the second PMD/PMA logic to convert, when the network port logic is in the multi-lane mode, a parallel data comprising first parallel data and second parallel data to a decoded parallel data using a second line code different than the first line code;
a first media access control (MAC) logic coupled to the first PCS logic to convert the first decoded parallel data to first Ethernet frame data at a first data rate determined by the first line transmission speed and a second MAC logic coupled to the second PCS logic to convert the second decoded parallel data to second Ethernet frame data at a second data rate determined by the second line transmission speed when the network port logic is not in the multi-lane mode and; and
a multi-lane MAC logic coupled to the multi-lane PCS logic to convert, when the network port logic is in the multi-lane mode, to convert the decoded parallel data to Ethernet frame data at a data rate comprising a sum of the first and second line transmission speeds.

2. The network port logic of claim 1, wherein to decode the first parallel data comprises to decode an encoded block, wherein the encoded block comprises an unscrambled sync symbol and a scrambled data section indicative of the decoded parallel data.

3. The network port logic of claim 2, wherein the encoded block comprises 66 bits, the sync symbol comprises two bits, and the scrambled data section comprises 64 bits indicative of 64 bits of decoded parallel data.

4. The network port logic of claim 1, wherein:
the first PMD/PMA logic is further to convert third serial binary data received via the first communication lane at the second line transmission speed to third parallel data;
the first PCS logic is further to decode the third parallel data to third decoded parallel data using the first line code; and
the first MAC logic is further to convert the third decoded parallel data to third Ethernet frame data at a third data rate determined by the second line transmission speed.

5. The network port logic of claim 4, further comprising:
a core clock signal to define a the core clock rate, wherein the first PCS logic and the first MAC logic are to operate at the core clock rate; and
an auto-negotiation module to:
negotiate with a link partner whether to receive via the first transmission lane at the first line transmission speed or at the second line transmission speed; and
generate a plurality of null operations to be executed by the first PCS logic and the first MAC logic in response to receipt of the third serial binary data at the second line transmission speed, wherein the null operations are to cause the first PCS logic and the first MAC logic to operate at an effective clock rate, lower than the core clock rate.

6. The network port logic of claim 1, wherein the first line transmission speed comprises about 25 gigabits per second, the second line transmission speed comprises about 10 gigabits per second, and the data rate determined by the first line transmission speed comprises 25 gigabits per second.

7. The network port logic of claim 1, further comprising:
an the auto-negotiation module to negotiate with a link partner whether to receive via the first transmission lane at the first line transmission speed or at the second line transmission speed;
wherein the first PMD/PMA logic is further to (i) execute a link training protocol in response to a negotiation with the link partner to receive at the first line transmission speed and (ii) execute the same link training protocol in response to a negotiation with the link partner to receive at the second line transmission speed.

8. The network port logic of claim 1, wherein the network port logic comprises:
four PMD/PMA logics, wherein each of the PMD/PMA logics is coupled to a corresponding communication lane and is to convert serial binary data received via the corresponding communication lane to corresponding parallel data, and wherein the four PMD/PMA logics comprise the first PMD/PMA logic and the second PMD/PMA logic;
four PCS logics, wherein each of the PCS logics is coupled to a corresponding PMD/PMA logic and is to decode the corresponding parallel data to corresponding decoded parallel data using the first line code also used by the second PCS logic for second serial binary data transmitted at the second line transmission speed, wherein the four PCS logics comprise the first PCS logic and the second PCS logic; and
four MAC logics, wherein each of the MAC logics is coupled to a corresponding PCS logic and is to convert the corresponding decoded parallel data to corresponding Ethernet frame data at a corresponding data rate determined by the first line transmission speed, wherein the four MAC logics comprise the first MAC logic and the second MAC logic.

9. The network port logic of claim 8, wherein:
the multi-lane PCS logic is coupled to the four PMD/PMA logics; and the data rate is equal to a sum of corresponding transmission speeds at which the corresponding serial binary data received at each of the corresponding transmission lanes.

10. The network port logic of claim 9, further comprising: a port channel coupled to the four MAC logics and the multi-lane MAC logic; and
a network switch fabric coupled to the port channel.

11. A method for high-speed data transmission, the method comprising:
receiving, by a network port logic, first serial binary data via a first communication lane at a first line transmission speed and second serial binary data via a second communication lane at a second line transmission speed, wherein the second transmission line speed is less than the first line transmission speed;
converting, by a first physical medium dependent sublayer/physical medium attachment sublayer (PMD/PMA) logic of the network port logic, the first serial binary data to first parallel data and, by a second PMD/PMA logic of the network port logic, the second serial binary data to second parallel data;
decoding, by a physical coding sublayer (PCS) logic of the network port logic and when the network port logic is not in a multi-lane mode, the first parallel data to first decoded parallel data using a first line code also used by a second PCS logic to decode the second serial binary data to second decoded parallel data when the network port logic is not in the multi-lane mode
converting, by a multi-lane PCS logic coupled to the first PMD/PMA logic and the second PMD/PMA logic and when the network port logic is in the multi-lane mode, a parallel data comprising the first parallel data and the second parallel data to a decoded parallel data using a second line code different than the first line code;
converting, by a first media access control (MAC) logic of the network port logic coupled to the first PCS logic and when the network port logic is in not in the multi-lane mode, the first decoded parallel data to first Ethernet frame data at a first data rate determined by the first line transmission speed and, by a second MAC logic of the network port logic coupled to the second PCS logic, the second decoded parallel data to second Ethernet frame data at a second data rate determined by the second line transmission speed; and
converting, by a multi-lane MAC logic coupled to the multi-lane PCS logic and when the network port logic is in the multi-lane mode, the decoded parallel data to Ethernet frame data at a data rate comprising a sum of the first and second line transmission speeds.

12. The method of claim 11, wherein decoding the first parallel data comprises decoding an encoded block, wherein the encoded block comprises an unscrambled sync symbol and a scrambled data section indicative of the decoded parallel data.

13. The method of claim 11, further comprising: negotiating, by the network port logic with a link partner, whether to receive via the first transmission lane at the first line transmission speed or at the second line transmission speed;
executing, by the network port logic, a link training protocol in response to negotiating with the link partner to receive at the first line transmission speed;
and executing, by the network port logic, the same link training protocol in response to negotiating with the link partner to receive at the second line transmission speed.

14. The method of claim 11, further comprising:
receiving, by the network port logic, ninth serial binary data via a second communication lane at the first line transmission speed;
converting, by a second PMD/PMA logic of the network port logic, the ninth serial binary data to ninth parallel data;
decoding, by a second physical coding sublayer (PCS) logic of the network port logic and when the network port logic is not in a multi-lane mode, the ninth parallel data to ninth decoded parallel data using the first line code;
converting, by a second media access control (MAC) logic of the network port logic, the ninth decoded parallel data to ninth Ethernet frame data at the ninth data rate determined by the first line transmission speed;
receiving, by the network port logic, third serial binary data via a third communication lane at the first line transmission speed;
converting, by a third PMD/PMA logic of the network port logic, the third serial binary data to third parallel data;
decoding, by a third physical coding sublayer (PCS) logic of the network port logic and when the network port logic is not in a multi-lane mode, the third parallel data to third decoded parallel data using the first line code;
converting, by a third media access control (MAC) logic of the network port logic and when the network port logic is not in a multi-lane mode, the third decoded parallel data to third Ethernet frame data at the third data rate determined by the first line transmission speed;
receiving, by the network port logic, fourth serial binary data via a fourth communication lane at the first line transmission speed;
converting, by a fourth PMD/PMA logic of the network port logic, the fourth serial binary data to fourth parallel data;

decoding, by a fourth physical coding sublayer (PCS) logic of the network port logic and when the network port logic is not in a multi-lane mode, the fourth parallel data to fourth decoded parallel data using the first line code; and converting, by a fourth media access control (MAC) logic of the network port logic and when the network port logic is not in a multi-lane mode, the fourth decoded parallel data to fourth Ethernet frame data at the fourth data rate determined by the first line transmission speed.

15. The method of claim 14, further comprising:

receiving, by the network port logic, fifth serial binary data via the first communication lane at the first line transmission speed, sixth serial binary data via the second communication lane at the first line transmission speed, seventh serial binary data via the third communication lane at the first line transmission speed, and eighth serial binary data via the fourth communication lane at the first line transmission speed;

converting, by the first PMD/PMA logic of the network port logic, the fifth serial binary data to fifth parallel data;

converting, by the second PMD/PMA logic of the network port logic, the sixth serial binary data to sixth parallel data;

converting, by the third PMD/PMA logic of the network port logic, the seventh serial binary data to seventh parallel data;

converting, by the fourth PMD/PMA logic of the network port logic, the eighth serial binary data to eighth parallel data;

decoding, by the multi-lane physical coding sublayer (PCS) logic of the network port logic and when the network Dort logic is in a multi-lane mode, the fifth parallel data, sixth parallel data, seventh parallel data, and eighth parallel data to fifth decoded parallel data using the second line code, wherein the second line code is different from the first line code used by the first PCS logic, the second PCS logic, the third PCS logic, and the fourth PCS logic for serial binary data transmitted at the second line transmission speed; and converting, by the multi-lane MAC logic of the network port logic and when the network port logic is in a multi-lane mode, the fifth decoded parallel data to fifth Ethernet frame data at a data rate equal to four times the first line transmission speed.

16. One or more non-transitory computer-readable storage media comprising a plurality of instructions that in response to being executed cause a network port logic to:

receive first serial binary data via a first communication lane at a first line transmission speed and second serial binary data via a second communication lane at a second line transmission speed, wherein the second transmission line speed is less than the first line transmission speed;

convert, by a first physical medium dependent sublayer/physical medium attachment sublayer (PMD/PMA) logic of the network port logic, the first serial binary data to first parallel data and, by a second PMD/PMA logic of the network port logic, the second serial binary data to second parallel data;

decode, by a physical coding sublayer (PCS) logic of the network port logic and when the network port logic is not in a multi-lane mode, the first parallel data to first decoded parallel data using a first line code also used by a second PCS logic to decode the second serial binary data to second decoded parallel data when the network port logic is not in the multi-lane mode;

convert, by a multi-lane PCS logic coupled to the first PMD/PMA logic and the second PMD/PMA logic and when the network port logic is in the multi-lane mode, a parallel data comprising the first parallel data and the second parallel data to a decoded parallel data using a second line code different than the first line code;

convert, by a first media access control (MAC) logic of the network port logic coupled to the first PCS logic and when the network port logic is in not in the multi-lane mode, the first decoded parallel data to first Ethernet frame data at a first data rate determined by the first line transmission speed and, by a second MAC logic of the network port logic coupled to the second PCS logic, the second decoded parallel data to second Ethernet frame data at a second data rate determined by the second line transmission speed; and convert, by a multi-lane MAC logic coupled to the multi-lane PCS logic and when the network port logic is in the multi-lane mode, the decoded parallel data to Ethernet frame data at a data rate comprising a sum of the first and second line transmission speeds.

17. The one or more non-transitory computer-readable storage media of claim 16, wherein to decode the first parallel data comprises to decode an encoded block, wherein the encoded block comprises an unscrambled sync symbol and a scrambled data section indicative of the decoded parallel data.

18. The one or more non-transitory computer-readable storage media of claim 16, further comprising a plurality of instructions that in response to being executed cause the network port logic to:

receive ninth serial binary data via the first communication lane at the second line transmission speed;

convert, by the first PMD/PMA logic of the network port logic, the ninth serial binary data to ninth parallel data;

decode, by the first PCS logic of the network port logic, the ninth parallel data to second decoded parallel data using the first line code; and convert, by the first MAC logic of the network port logic, the ninth decoded parallel data to ninth Ethernet frame data at a ninth data rate determined by the second line transmission speed.

19. The one or more non-transitory computer-readable storage media of claim 18, further comprising a plurality of instructions that in response to being executed cause the network port logic to:

negotiate, with a link partner, whether to receive via the second transmission lane at the first line transmission speed or at the second line transmission speed;

operate the second PCS logic and the second MAC logic at a core clock rate; and operate the second PCS logic and the second MAC logic at an effective clock rate in response to negotiating to receive the second serial binary data at the second line transmission speed by generating a plurality of null operations to be executed by the second PCS logic and the second MAC logic, wherein the effective clock rate is lower than the core clock rate.

20. The one or more non-transitory computer-readable storage media of claim 16, further comprising a plurality of instructions that in response to being executed cause the network port logic to:

negotiate, with a link partner, whether to receive via the first transmission lane at the first line transmission speed or at the second line transmission speed;

execute a link training protocol in response to negotiating with the link partner to receive at the first line transmission speed; and execute the same link training protocol in response to negotiating with the link partner to receive at the second line transmission speed.

21. The one or more non-transitory computer-readable storage media of claim 16, further comprising a plurality of instructions that in response to being executed cause the network port logic to:

receive ninth serial binary data via a second communication lane at the first line transmission speed;

convert, by a second PMD/PMA logic of the network port logic, the ninth serial binary data to ninth parallel data;

decode, by a second physical coding sublayer (PCS) logic of the network port logic and when the network port logic is not in a multi-lane mode, the ninth parallel data to ninth decoded parallel data using the first line code;

convert, by a second media access control (MAC) logic of the network port logic and when the network port logic is not in a multi-lane mode, the ninth decoded parallel data to ninth Ethernet frame data at the ninth data rate determined by the first line transmission speed;

receive third serial binary data via a third communication lane at the first line transmission speed;

convert, by a third PMD/PMA logic of the network port logic, the third serial binary data to third parallel data;

decode, by a third physical coding sublayer (PCS) logic of the network port logic and when the network port logic is not in a multi-lane mode, the third parallel data to third decoded parallel data using the first line code;

convert, by a third media access control (MAC) logic of the network port logic, and when the network port logic is not in a multi-lane mode the third decoded parallel data to third Ethernet frame data at the third data rate determined by the first line transmission speed;

receive fourth serial binary data via a fourth communication lane at the first line transmission speed;

convert, by a fourth PMD/PMA logic of the network port logic, the fourth serial binary data to fourth parallel data;

decode, by a fourth physical coding sublayer (PCS) logic of the network port logic and when the network port logic is not in a multi-lane mode, the fourth parallel data to fourth decoded parallel data using the first line code; and convert, by a fourth media access control (MAC) logic of the network port logic and when the network port logic is not in a multi-lane mode, the fourth decoded parallel data to fourth Ethernet frame data at the fourth data rate determined by the first line transmission speed.

22. The one or more non-transitory computer-readable storage media of claim 21, further comprising a plurality of instructions that in response to being executed cause the network port logic to:

receive fifth serial binary data via the first communication lane at the first line transmission speed, sixth serial binary data via the second communication lane at the first line transmission speed, seventh serial binary data via the third communication lane at the first line transmission speed, and eighth serial binary data via the fourth communication lane at the first line transmission speed;

convert, by the first PMD/PMA logic of the network port logic, the fifth serial binary data to fifth parallel data;

convert, by the second PMD/PMA logic of the network port logic, the sixth serial binary data to sixth parallel data;

convert, by the third PMD/PMA logic of the network port logic, the seventh serial binary data to seventh parallel data;

convert, by the fourth PMD/PMA logic of the network port logic, the eighth serial binary data to eighth parallel data;

decode, by the multi-lane physical coding sublayer (PCS) logic of the network port logic and when the network port logic is in a multi-lane mode, the fifth parallel data, sixth parallel data, seventh parallel data, and eighth parallel data to fifth decoded parallel data using the second line code, wherein the second line code is different from the first line code also used by the first PCS logic, the second PCS logic, the third PCS logic, and the fourth PCS logic for serial binary data transmitted at the second line transmission speed; and convert, by the multi-lane MAC logic of the network port logic and when the network port logic is in a multi-lane mode, the fifth decoded parallel data to fifth Ethernet frame data at a data rate equal to four times the first line transmission speed.

\* \* \* \* \*